US010280380B2

(12) United States Patent
Papin et al.

(10) Patent No.: US 10,280,380 B2
(45) Date of Patent: May 7, 2019

(54) COMPOSITION OF ADDITIVES AND HIGH-PERFORMANCE FUEL COMPRISING SUCH A COMPOSITION

(71) Applicant: TOTAL MARKETING SERVICES, Puteaux (FR)

(72) Inventors: Géraldine Papin, Lyons (FR); Julien Gueit, Lyons (FR)

(73) Assignee: Total Marketing Services, Puteaux (FR)

(*) Notice: Subject to any disclaimer, the term of this patent is extended or adjusted under 35 U.S.C. 154(b) by 0 days.

(21) Appl. No.: 15/119,807

(22) PCT Filed: Feb. 17, 2015

(86) PCT No.: PCT/EP2015/053346
§ 371 (c)(1),
(2) Date: Aug. 18, 2016

(87) PCT Pub. No.: WO2015/124584
PCT Pub. Date: Aug. 27, 2015

(65) Prior Publication Data
US 2017/0058225 A1    Mar. 2, 2017

(30) Foreign Application Priority Data

Feb. 24, 2014  (FR) ..................... 14 51437

(51) Int. Cl.
| | | |
|---|---|---|
| *C10L 10/04* | (2006.01) | |
| *C10L 1/22* | (2006.01) | |
| *C10L 10/06* | (2006.01) | |
| *C10L 1/18* | (2006.01) | |
| C10L 1/19 | (2006.01) | |
| C10L 1/222 | (2006.01) | |
| C10L 1/232 | (2006.01) | |
| C10L 1/2383 | (2006.01) | |

(52) U.S. Cl.
CPC .............. *C10L 10/04* (2013.01); *C10L 1/18* (2013.01); *C10L 1/22* (2013.01); *C10L 10/06* (2013.01); C10L 1/191 (2013.01); C10L 1/221 (2013.01); C10L 1/2222 (2013.01); C10L 1/232 (2013.01); C10L 1/2383 (2013.01); C10L 2200/0446 (2013.01); C10L 2200/0476 (2013.01); C10L 2230/22 (2013.01); C10L 2270/026 (2013.01); C10L 2300/20 (2013.01); Y02E 50/13 (2013.01)

(58) Field of Classification Search
CPC combination set(s) only.
See application file for complete search history.

(56) References Cited

U.S. PATENT DOCUMENTS

| | | | |
|---|---|---|---|
| 3,018,250 A | 1/1962 | Anderson et al. | |
| 3,172,892 A | 3/1965 | Le Seur | |
| 3,361,673 A | 1/1968 | Stuart et al. | |
| 3,778,371 A | 12/1973 | Malec et al. | |
| 4,171,959 A | 10/1979 | Vartanian | |
| 4,253,980 A | 3/1981 | Hammond et al. | |
| 4,257,779 A | 3/1981 | Sung et al. | |
| 4,282,007 A | 8/1981 | Sung | |
| 4,326,973 A | 4/1982 | Hammond et al. | |
| 4,338,206 A | 7/1982 | Hammond et al. | |
| 4,511,369 A | 4/1985 | Denis et al. | |
| 4,604,102 A | 8/1986 | Zaweski et al. | |
| 4,652,273 A | 3/1987 | Maldonado et al. | |
| 4,664,676 A | 5/1987 | Denis et al. | |
| 4,731,095 A | 3/1988 | Garapon et al. | |
| 4,900,332 A | 2/1990 | Denis et al. | |
| 5,106,515 A | 4/1992 | Denis et al. | |
| 5,254,138 A | 10/1993 | Kurek | |
| 5,256,740 A | 10/1993 | Denis et al. | |
| 5,449,386 A | 9/1995 | Denis et al. | |
| 5,456,730 A | 10/1995 | Hart et al. | |
| 5,993,498 A | 11/1999 | Vrahopoulou et al. | |
| 5,998,530 A | 12/1999 | Krull et al. | |
| 6,071,318 A | 6/2000 | Mallet et al. | |
| 6,096,104 A | 8/2000 | Van den Neste et al. | |
| 6,784,317 B2 | 8/2004 | Kanbara et al. | |
| 7,291,758 B2 | 11/2007 | Bohnenpoll et al. | |
| 7,374,589 B2 | 5/2008 | Bernasconi et al. | |
| 7,947,241 B2 | 5/2011 | Schmelzle et al. | |
| 7,951,211 B2 | 5/2011 | Barton et al. | |
| 8,097,570 B2 | 1/2012 | Boitout et al. | |
| 8,334,245 B2 | 12/2012 | Lancon et al. | |

(Continued)

FOREIGN PATENT DOCUMENTS

| | | |
|---|---|---|
| EP | 0261959 A2 | 3/1988 |
| EP | 0271385 A1 | 6/1988 |

(Continued)

OTHER PUBLICATIONS

Caprotti, Rinaldo, et al.: "Deposit Control in Modern Diesel Fuel Injection," SAE Int. J. Fuels Lubr., vol. 3, Issue 2, Oct. 25, 2010, pp. 901-915.

(Continued)

*Primary Examiner* — Ellen M McAvoy
*Assistant Examiner* — Chantel L Graham
(74) *Attorney, Agent, or Firm* — Harness, Dickey & Pierce, PLC

(57) ABSTRACT

A composition of fuel additives includes at least a first additive of a triazole derivative and a second additive of a quaternary ammonium salt. The disclosure also relates to a diesel fuel including such a composition and the use of a fuel for limiting deposits in a diesel engine. In particular, the fuel containing the composition of additives is used in direct-injection diesel engines.

31 Claims, 2 Drawing Sheets

(56) References Cited

U.S. PATENT DOCUMENTS

| | | |
|---|---|---|
| 8,961,623 B2 | 2/2015 | Stevenson et al. |
| 8,980,805 B2 | 3/2015 | Doyen et al. |
| 9,021,854 B2 | 5/2015 | Godel et al. |
| 9,169,452 B2 | 10/2015 | Dolmazon et al. |
| 9,174,202 B2 | 11/2015 | Marchand et al. |
| 2005/0223631 A1 | 10/2005 | Jackson |
| 2008/0052985 A1 | 3/2008 | Stevenson et al. |
| 2008/0113890 A1 | 5/2008 | Moreton et al. |
| 2010/0015022 A1 | 1/2010 | Schmelzle et al. |
| 2010/0167969 A1 | 7/2010 | Doyen et al. |
| 2010/0251606 A1 | 10/2010 | Tort et al. |
| 2010/0275508 A1 | 11/2010 | Dolmazon et al. |
| 2011/0077177 A1 | 3/2011 | Doyen |
| 2011/0092403 A1 | 4/2011 | Lancon et al. |
| 2012/0010112 A1 | 1/2012 | Grabarse et al. |
| 2012/0210966 A1 | 8/2012 | Wager et al. |
| 2012/0272710 A1 | 11/2012 | Godel et al. |
| 2013/0008829 A1 | 1/2013 | Marchand et al. |
| 2013/0031828 A1 | 2/2013 | Reid et al. |
| 2013/0255139 A1 | 10/2013 | Dolmazon et al. |
| 2014/0041610 A1 | 2/2014 | Lancon et al. |
| 2014/0076780 A1 | 3/2014 | Guichard et al. |
| 2015/0113863 A1 | 4/2015 | Papin et al. |
| 2016/0002559 A1 | 1/2016 | Iovine et al. |
| 2016/0024411 A1 | 1/2016 | Arondel et al. |
| 2016/0046884 A1 | 2/2016 | Dolmazon et al. |
| 2016/0068776 A1 | 3/2016 | Papin et al. |
| 2016/0177216 A1 | 6/2016 | Lancon et al. |

FOREIGN PATENT DOCUMENTS

| | | |
|---|---|---|
| EP | 0565285 A1 | 10/1993 |
| EP | 663000 A1 | 7/1995 |
| EP | 0674689 A1 | 10/1995 |
| EP | 680506 A1 | 11/1995 |
| EP | 0736590 A2 | 10/1996 |
| EP | 839174 A1 | 5/1998 |
| EP | 1591514 A2 | 11/2005 |
| FR | 2528051 A1 | 12/1983 |
| FR | 2528423 A1 | 12/1983 |
| GB | 949981 A | 2/1964 |
| WO | WO-9314178 A1 | 7/1993 |
| WO | WO-2007/015080 A1 | 2/2007 |

OTHER PUBLICATIONS

Guibet, J. C.: "Carburants et Moteurs," 2, Publications de L'Institut Français du Pétrole, Éditions Technip., pp. 642-643, 2007.

Schwab, Scott D., et al.: "Internal Injector Deposits in High-Pressure Common Rail Diesel Engines," SAE Int. J. Fuels Lubr., vol. 3, Issue 2, Oct. 25, 2010, pp. 865-878.

Ullmann, Jörg, et al.: "Investigation into the Formation and Prevention of Internal Diesel Injector Deposits," SAE International, 2008 World Congress, Apr. 14-17, 2008, 12 pages.

Ziejewski, Mariusz, et al.: "Reduced Injection Needle Mobility Caused by Lacquer Deposits from Sunflower Oil," SAE International, International Congress and Exposition, Feb. 29-Mar. 4, 1988, 12 pages.

COMPOSITION OF ADDITIVES AND HIGH-PERFORMANCE FUEL COMPRISING SUCH A COMPOSITION

CROSS-REFERENCE TO RELATED APPLICATIONS

This application is a National Phase Entry of International Patent Application No. PCT/EP2015/053346, filed on Feb. 17, 2015, which claims priority to French Patent Application Serial No. 14 51 437, filed on Feb. 24, 2014, both of which are incorporated by reference herein.

BACKGROUND

The present invention relates to compositions of additives and fuels containing such compositions of additives. The present invention relates in particular to compositions of additives for diesel and/or bio diesel fuel. The present invention further relates to the use of such fuels in diesel engines to improve their performance, in particular in diesel engines with a fuel injection system of type Euro 3 to Euro 6.

Fuels that are marketed must comply with national or supranational specifications (for example standard EN 590 for diesel fuels in the EU). For commercial fuels, there is no legal obligation concerning the incorporation of additives. From the commercial point of view, in the area of fuel distribution, a distinction is made between "base price" fuels, with few or no additives, and higher-grade fuels in which one or more additives are incorporated to improve their performance (beyond the regulatory performance).

In many countries the sulphur content of diesel fuels has been subject to a very significant reduction for environmental reasons, in particular in order to reduce SO2 emissions. For example, in Europe, the maximum sulphur content of fuels of the diesel type for road vehicles is currently 10 ppm by mass. To compensate for the loss of compounds providing the lubricating character of these fuels, numerous lubricity and/or anti-wear and/or friction-modifying additives have been introduced into the fuels that are marketed. Their characteristics are broadly described in patents EP915944, EP839174 and EP680506.

As shown in FIGS. 1 and 2, it was found that when using certain higher-grade diesel fuels, deposits 1 appeared on the needles 2 of injector 3 of the injection systems of diesel engines, in particular those of type Euro 3 to Euro 6. Thus, the use of anti-wear and/or friction-modifying additives and/or additives against deposits of the coking type have sometimes displayed resistance to lacquering that is unsatisfactory, or even very inadequate. This is reflected in the formation of deposit 1 generally covered by the term lacquering, which will be used hereinafter, or using the acronym IDID (Internal Diesel Injector Deposits).

Within the meaning of the present invention, the phenomenon of lacquering does not relate to the deposits that are present outside the injection system 5 or 5' (FIGS. 1 and 3) and are associated with coking, which is the cause of fouling and partial or complete clogging of the injection nozzles 4 or 4' (nozzle "coking" or "fouling"). Lacquering and coking are two quite distinct phenomena both with respect to the causes of these deposits, the conditions of appearance of these deposits and the place where these deposits occur. Coking is a phenomenon that only appears downstream of a diesel injection system.

As shown in FIG. 3, the deposits 5' formed are characterized in that they result from pyrolysis of the hydrocarbons entering the combustion chamber and have the appearance of carbonaceous deposits. In the case of high-pressure, direct-injection diesel engines, it was found that the tendency to coking is far less pronounced. This coking is simulated conventionally by the standard engine test CEC F098-08 DW10B, especially when the fuel tested is contaminated with metallic zinc.

In the case of engines with indirect injection, combustion of the fuel does not take place directly in the combustion chamber as for engines with direct injection. As described for example in U.S. Pat. No. 4,604,102, there is a prechamber before the combustion chamber in which fuel injection takes place. The pressure and temperature in a prechamber are lower than in the combustion chamber of direct-injection engines.

Under these conditions, pyrolysis of the fuel produces carbon, which is deposited on the surface of the nozzles 4' of the injectors ("throttling diesel nozzle") and clogs the orifices 6 of the nozzles 4' (FIG. 3). Only the surfaces of the nozzle 4' exposed to the combustion gases display a risk of deposition of carbon (coking). In terms of performance, the phenomenon of coking causes a loss of engine power. Lacquering is a phenomenon that only arises in direct-injection diesel engines and only occurs in the injection system.

As shown in FIGS. 1 and 2, the injectors 3 of direct-injection diesel engines comprise a needle 2, the lift of which allows precise control of the quantity of fuel injected at high pressure directly into the combustion chamber. Lacquering causes the appearance of deposits 1, which appear specifically at the level of the needles 2 of the injectors 3 (FIGS. 1 and 2). The phenomenon of lacquering is associated with the formation of soap and/or lacquer in the internal components of the injection systems of engines for fuels of the diesel and/or bio diesel type. The lacquering deposit 1 may be located on the end 4 of the needles 2 of injectors 3, both on the head and on the body of the needles 2 of the fuel injection system but also throughout the whole system for controlling needle lift (valves not shown) of the injection system. This phenomenon is particularly marked for engines using higher-grade diesel fuels. When these deposits are present in large quantities, the mobility of the needle 2 of the injector 3 fouled by these deposits 1 is compromised. Moreover, in contrast to coking, lacquering may also cause an increase in engine noise and sometimes problems when starting. In fact, the parts of the needles 2 fouled by the deposits of soap and/or of lacquer 1 may stick to the inside walls of the injector 3. The needles 2 are then blocked and the fuel no longer passes through.

Deposits of the lacquering type are generally divided into 2 types:
1. deposits that are rather whitish and pulverulent; on analysis, it is found that these deposits consist essentially of soaps of sodium (sodium carboxylates, for example) and/or of calcium (type 1 deposits);
2. organic deposits like coloured lacquers located on the body of the needle (type 2 deposits)

Regarding the type 1 deposits, there may be several sources of sodium in bio diesel fuels of type Bx:
the catalysts for transesterification of vegetable oils for producing esters of the type of (m)ethyl fatty acid esters such as sodium formate;
sodium may also originate from the corrosion inhibitors used when conveying petroleum products in certain pipes, such as sodium nitrite;

finally, accidental exogenous contamination, via water or air for example, may contribute to the introduction of sodium into fuels (sodium being a very common element).

There are several possible sources of acids in fuels containing bio diesels, for example:
the residual acids of the biofuels (see standard EN14214, which stipulates a maximum permitted level of acids)
the corrosion inhibitors used when conveying petroleum products in certain pipes, such as DDSA (dodecenyl-succinic anhydride) or HDSA (hexadecenylsuccinic anhydride) or certain of their functional derivatives such as acids.

Regarding the type 2 organic deposits, certain publications state that they may in particular originate from reactions between deposit reducing agents/dispersants used for preventing coking (for example detergents of the PIBSI type derived from polyamines) and acids (which would be present among other things as impurities of the fatty acid esters of the bio diesel). In the publication SAE 880493, *Reduced Injection Needle Mobility Caused by Lacquer Deposits from Sunflower Oil*, the authors M. Ziejewski and H. J. Goettler describe the phenomenon of lacquering and its harmful consequences for the operation of engines using sunflower oils as fuel. In the publication SAE 2008-01-0926, *Investigation into the Formation and Prevention of Internal Diesel Injector Deposits*, the authors J. Ullmann, M. Geduldig, H. Stutzenberger (Robert Bosch GmbH) and R. Caprotti, G. Balfour (Infineum) also describe the reactions between acids and deposit reducing agents/dispersants to explain the type 2 deposits.

Moreover, in the publication SAE International, 2010-01-2242, Internal Injector Deposits in High-Pressure Common Rail Diesel Engines, the authors S. Schwab, J. Bennett, S. Dell, J. Galante-Fox, A. Kulinowski and Keith T. Miller explain that the internal parts of the injectors are generally coated with a slightly coloured deposit that is visible to the naked eye. Their analyses enabled them to determine that this was predominantly sodium salts of alkenyl-(hexadecenyl- or dodecenyl-)-succinic acids; the sodium originating from drying agents, from caustic liquor used in the refinery, from tank bottom water or from seawater, and the succinic diacids being used as corrosion inhibitors or present in multifunctional additive packages. Once formed, these salts are insoluble in low-sulphur diesel fuels and, as they are in the form of fine particles, they pass through the diesel filters and are deposited inside the injectors. In this publication, the development of an engine test is described and allows the deposits to be reproduced.

In the publication SAE International, 2010-01-2250, Deposit Control in Modern Diesel Fuel Injection System, the authors, R. Caprotti, N. Bhatti and G. Balfour, also investigate the same type of internal deposits in the injectors and assert that the appearance of deposits is not connected specifically with a type of fuel (diesel or containing bio diesels) nor with a type of vehicle (light vehicles or lorries) equipped with modern engines (common rail). They show the performance of a new deposit reducing agent/dispersant, effective on all types of deposits (coking and lacquering).

Accumulation of deposits of the lacquering type as described above may lead to the following problems:
a slowing of the response of the fuel injector,
sticking of the internal components, which may lead to a loss of control of the injection time as well as of the quantity of fuel supplied per injection,
a deterioration in the driving pleasure of the vehicle,
variations of power,
an increase in fuel consumption,
an increase in pollutants,
disturbance of combustion, since the quantity of fuel injected will not be what is envisaged theoretically and the injection profile will be different,
unstable idling of the vehicle,
an increase in noise produced by the engine,
a decline in the quality of combustion in the long term,
a decline in the quality of atomization.

In the case when there would be a heavy deposit of the lacquering type, the vehicle could have great difficulty starting, or even may no longer start at all, since the needle allowing injection would be blocked.

SUMMARY

The present invention makes it possible to overcome the drawbacks indicated above. In the context of his research, the applicant showed that the combination of two particular additives allowed a surprising synergistic effect to be obtained in particular for controlling deposits on the injectors. The present invention proposes compositions of additives capable of tangibly improving the control of deposits, in particular of the lacquering type of diesel and/or bio diesel fuels. The present invention also relates to compositions of additives that also improve the control of deposits of the coking type and/or the lubricating properties of diesel and/or bio diesel fuel.

The present invention relates to a composition of fuel additives comprising at least:
a first additive comprising a triazole derivative of the following formula (I):

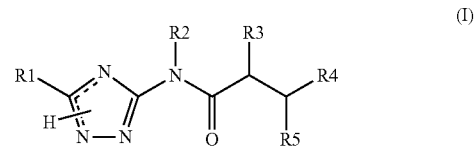

in which:
$R_1$ is selected from the group consisting of a hydrogen atom, a linear or branched $C_1$ to $C_8$ aliphatic hydrocarbon group, a carboxyl group (—$CO_2H$),
$R_2$ and $R_5$ are identical or different and represent, independently of one another, a group selected from the group consisting of a hydrogen atom and a linear or branched, saturated or unsaturated $C_1$ to $C_{33}$ aliphatic hydrocarbon group, optionally comprising one or more oxygen atoms in the form of a carbonyl function (—CO—) and/or carboxyl function (—$CO_2H$), said $R_2$ and $R_5$ groups optionally forming together a ring with 5 to 8 atoms comprising nitrogen, to which $R_2$ is bound, it being understood that in this case $R_2$ and $R_5$ then constitute one and the same linear or branched, saturated or unsaturated $C_1$ to $C_{33}$ aliphatic hydrocarbon group, optionally substituted with one or more oxygen atoms in the form of a carbonyl function (—CO—) and/or carboxyl function (—$CO_2H$),
$R_3$ and $R_4$ are identical or different and represent, independently of one another, a group selected from the group consisting of a hydrogen atom and a linear or branched, saturated or unsaturated, cyclic or acyclic, aliphatic hydrocarbon group, having from 2 to 200 carbon atoms, a second additive comprising a quaternary ammonium salt obtained by reaction of a nitrogen-containing compound comprising a tertiary amine function with a quaternizing agent, said nitrogen-containing compound being selected from:

a) the product of reaction of an acylating agent substituted with a hydrocarbon group and a compound comprising at least one tertiary amine group and a group selected from the primary and secondary amines and the alcohols, b) a product of the Mannich reaction comprising a tertiary amine group; and c) amines substituted with a polyalkene group having at least one tertiary amine group.

According to a particular embodiment, the mass ratio of the first to the second additive (first:second) is comprised between 1:100 and 100:1, preferably between 1:10 and 10:1, even more preferably between 1:2 and 2:1. Advantageously, the triazole derivative has the formula (I) in which $R_3$ and $R_4$ are identical or different and represent, independently of one another, a group selected from the group consisting of a hydrogen atom and an aliphatic hydrocarbon group having a number-average molecular weight (Mn) comprised between 200 and 3000.

According to a particular embodiment, the triazole derivative is represented by the following formula (II) and/or (III):

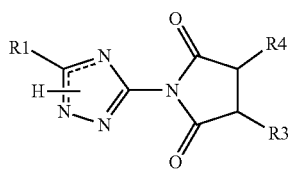

(II)

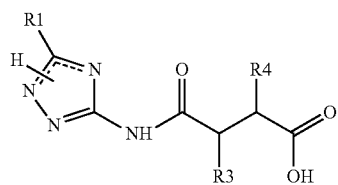

(III)

in which $R_1$, $R_3$ and $R_4$ are as defined above.

According to a further embodiment, the triazole derivative is obtained by reaction of an aminotriazole of the following formula (IV) with a diacid of the following formula (V) and/or a succinic anhydride of the following formula (VI):

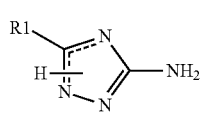

(IV)

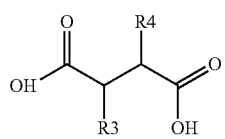

(V)

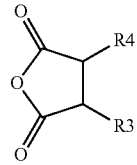

(VI)

in which $R_1$, $R_3$ and $R_4$ are as defined above.

According to a particular embodiment, the quaternizing agent is selected from the group constituted by the dialkyl sulphates, the carboxylic acid esters, the alkyl halides, the benzyl halides, the hydrocarbon carbonates and the hydrocarbon epoxides optionally mixed with an acid, alone or in a mixture.

According to another particular embodiment, the nitrogen containing compound comprises a product of reaction of an acylating agent substituted with a hydrocarbon group and an amine of the following formula (VII) or (VIII):

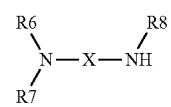

(VII)

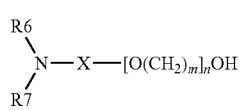

(VIII)

in which:

$R_6$ and $R_7$ are identical or different and represent, independently of one another, an alkyl group having from 1 to 22 carbon atoms;

X is an alkylene group having from 1 to 20 carbon atoms;

m is an integer comprised between 1 and 5;

n is an integer comprised between 0 and 20; and $R_8$ is a hydrogen atom or an alkyl group having from 1 to 22 carbon atoms.

According to another particular embodiment, the composition of additives further comprises a third additive comprising at least 50% by mass of a compound A selected from the partial esters of polyols and of saturated or unsaturated, linear or branched, cyclic or acyclic $C_4$ to $C_{36}$ monocarboxylic aliphatic hydrocarbons, said partial esters being able to be used alone or in a mixture. In particular, said compound A comprises x ester unit(s), y hydroxyl unit(s) and z ether unit(s), x, y and z being integers such that x varies from 1 to 10, y varies from 1 to 10, and z varies from 0 to 6. According to a further embodiment, the distribution of ester, hydroxyl and ether units in said compound A is such that x varies from 1 to 4, y varies from 1 to 7 and z varies from 1 to 3.

According to a particular embodiment, compound A is obtained by esterification between:

one or more $C_4$ to $C_{36}$ fatty acid(s) optionally comprising one or more ethylenic bonds; and a linear or branched, cyclic or acyclic polyol optionally comprising a heterocycle with 5 to 6 atoms, preferably a heterocycle with 4 to 5 carbon atoms and one oxygen atom, substituted with hydroxyl groups.

According to a further embodiment, the fatty acids are selected from the group constituted by stearic, isostearic, linolenic, oleic, linoleic, behenic, arachidonic, ricinoleic, palmitic, myristic, lauric, and capric acids, used alone or in a mixture. According to a particular embodiment, the polyol is selected from the polyols comprising more than three hydroxyl functions and the polyols comprising at least one heterocycle with 5 or 6 atoms, preferably heterocycles with 4 to 5 carbon atoms and one oxygen atom, optionally substituted with hydroxyl groups. According to another particular embodiment, the polyol is selected from the polyols comprising at least two heterocycles with 4 or 5 carbon atoms and one oxygen atom, linked by the formation of an acetal bond between a hydroxyl function of each ring, said heterocycles optionally being substituted with hydroxyl groups. According to a further embodiment, the polyol is selected from the group consisting of erythritol, xylitol, arabitol, ribitol, sorbitol, maltitol, isomaltitol, lactitol, volemitol, mannitol, pentaerythritol, 2-hydroxymethyl-1,3-propanediol, 1,1,1-tri(hydroxymethyl)ethane, trimethylolpropane, sorbitan and the carbohydrates such as sucrose, fructose, maltose, glucose and saccharose.

According to a particular embodiment, compound A is selected from the sorbitan partial esters, preferably the sorbitan mono-, di- and triesters, used alone or in a mixture, more preferably the sorbitan partial esters comprising more than 40% by mass of sorbitan triesters. According to another particular embodiment, compound A is selected from the monoester(s) and/or diester(s) of polyglycerols having from 2 to 5 glycerol units per molecule. In particular, compound A is selected from the monoester(s) and/or diester(s) of polyglycerols derived from fatty acid(s), having more than 50% by number of fatty chains comprising between 12 and 24 carbon atoms, preferably compound A is selected from the monoester(s) and/or diester(s) of diglycerol and/or of triglycerol, more preferably from the partial esters of diglycerol and/or of triglycerol comprising at least 50% by mass of monoester(s) and/or of diester(s) of oleic acid and of diglycerol.

The present invention also relates to the use of a composition of additives according to the present invention, in a diesel fuel having a sulphur content less than or equal to 500 ppm by mass, preferably comprising a bio diesel. The present invention also relates to a diesel fuel having a sulphur content less than or equal to 500 ppm by mass comprising at least 5 ppm by mass of a composition of additives according to the present invention, preferably a fuel comprising up to 30% by volume of bio diesel. According to a particular embodiment, the fuel additionally comprises at least one or more other additives selected from the antioxidants, combustion improvers, corrosion inhibitors, low temperature performance additives, dyes, demulsifiers, metal deactivators, antifoaming agents, cetane number improvers, lubricity additives, co-solvents and compatibilizing agents. In particular, the concentration by mass of each first and second additive and optionally third additive varies from 5 to 5000 ppm.

The present invention also relates to the use of a diesel fuel according to the present invention in a diesel engine, for improving the performance of said engine, in particular for:
limiting the deposits in said diesel engine,
reducing the fuel consumption of said engine ("Fuel Eco" effect),
minimizing the loss of power of said engine, maintaining the cleanliness of said engine ("keep-clean" effect) by limiting the deposits of soap and/or lacquer in the internal components of the injection systems of said engine, and/or cleaning the fouled internal parts of the injection system of said engine, by removing, at least partly, the deposits of soap and/or lacquer in said internal parts (curative "clean-up" effect).

According to a particular embodiment, the engine is a direct-injection engine, preferably with a high-pressure injection system ("common-rail").

DETAILED DESCRIPTION

Figure 1:
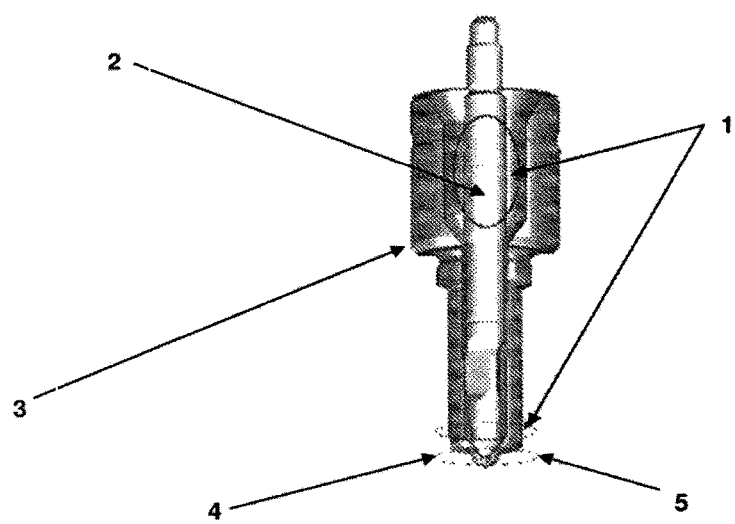
FIG. 1 is a photograph of a high-pressure, direct-injection diesel engine injector.
Figure 2:
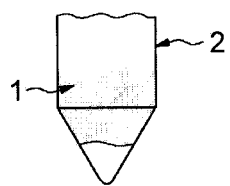
FIG. 2 is a photograph of a needle of a direct-injection diesel engine injector, fouled with deposits of the soap and/or lacquer type ("lacquering")
Figure 3:
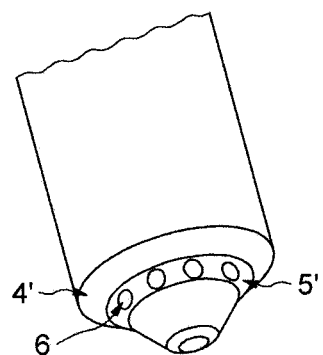
FIG. 3 is a photograph of a nozzle of an indirect-injection diesel engine injector, fouled with deposits of the coke type ("coking")

Other advantages and features will become clearer from the following description. The particular embodiments of the invention are given by way of non-limitative examples.

The present invention relates to a composition of additives comprising at least a first and a second additive, and optionally a third additive. The present invention also relates to the use of such a composition of additives in a diesel fuel having a sulphur content less than or equal to 500 ppm by mass, preferably comprising a bio diesel.

First Additive

The first additive comprises a triazole derivative of the following formula (I):

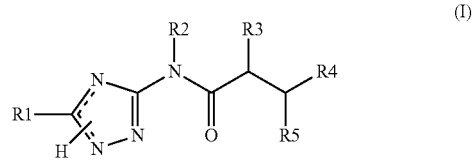

in which:
$R_1$ is selected from the group consisting of a hydrogen atom, a linear or branched $C_1$ to $C_8$, preferably $C_1$ to $C_4$, more preferably $C_1$ to $C_2$, aliphatic hydrocarbon group and a carboxyl group (—$CO_2H$). Preferably, $R_1$ is a hydrogen atom.

$R_2$ and $R_5$ are identical or different and represent, independently of one another, a group selected from the group consisting of a hydrogen atom and a linear or branched, saturated or unsaturated $C_1$ to $C_{33}$, preferably $C_1$ to $C_{21}$ aliphatic hydrocarbon group, optionally comprising one or more oxygen atoms in the form of a carbonyl function (—CO—) and/or carboxyl function (—$CO_2H$), said $R_2$ and $R_5$ groups optionally forming together a ring with 5 to 8 atoms comprising nitrogen, to which $R_2$ is bound, it being understood that in this case $R_2$ and $R_5$ then constitute one and the same linear or branched, saturated or unsaturated, $C_1$ to $C_{33}$, preferably $C_1$ to $C_{21}$ aliphatic hydrocarbon group, optionally substituted with one or more oxygen atoms in the form of a carbonyl function (—CO—) and/or carboxyl function (—$CO_2H$).

$R_3$ and $R_4$ are identical or different and represent, independently of one another, a group selected from the group consisting of a hydrogen atom and a linear or branched, saturated or unsaturated, cyclic or acyclic, aliphatic hydrocarbon group, having from 2 to 200 carbon atoms, preferably from 14 to 200 carbon atoms, more preferably from 50 to 170 carbon atoms, even more preferably between 60 and 120 carbon atoms.

It should be noted that the conventional rules of representation (bond with dashed line and labile bond) are applied to indicate that the position of the hydrogen atom and of the double bond of the triazole ring can change, said formula thus covering the two possible positions.

According to a particular embodiment, the triazole derivative has the formula (I) in which $R_3$ and $R_4$ are identical or different and represent, independently of one another, a group selected from the group consisting of a hydrogen atom and an aliphatic hydrocarbon group having a number-average molecular weight ($M_n$) comprised between 200 and 3000, preferably between 400 and 3000, more preferably between 400 and 2500, even more preferably between 400 and 1500 or between 500 and 1500. Said aliphatic hydrocarbon group is preferably a polyisobutylene group (also called polyisobutene, denoted PIB) having a number-average molecular weight ($M_n$) comprised between 200 and 3000, preferably between 400 and 3000, more preferably between 400 and 2500, even more preferably between 400 and 1500 or between 500 and 1500. $R_3$ and $R_4$ preferably represent, respectively, a hydrogen atom and a PIB group as described above or vice versa.

According to another particular embodiment, the triazole derivative is represented by the following formula (II):

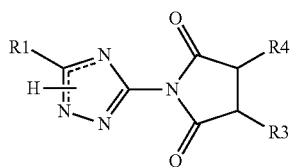

(II)

in which $R_1$, $R_3$ and $R_4$ are as defined above.

According to another particular embodiment, the triazole derivative is represented by the following formula (III):

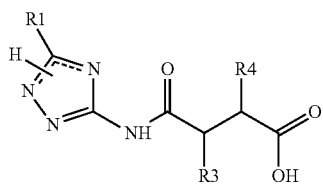

(III)

in which $R_1$, $R_3$ and $R_4$ are as defined above.

According to another particular embodiment, the first additive is a mixture of triazole derivatives of formulae (II) and (III) as defined above. The triazole derivative may be in the form of a mixture of derivatives in the closed form (II) and open form (III). The mass ratio (II):(III) in said mixture of the triazole derivatives in the closed and open form respectively may be comprised between 1:100 and 100:1, preferably between 50:10 and 90:10, more preferably between 91:9 and 99:1. A first additive comprising less than 10% by mass of triazole derivatives of formula (III) in the open form will be preferred. A triazole derivative or mixture of formula (II) and/or (III) will be preferred, where $R_1$ is a hydrogen atom and $R_3$ and $R_4$ represent respectively a hydrogen atom and a PIB group as described above or vice versa ($R_3$=PIB and $R_4$=H).

The triazole derivative may be obtained by any known process, in particular by reaction of an aminotriazole of the following formula (IV) with a diacid of the following formula (V) and/or a succinic anhydride of the following formula (VI):

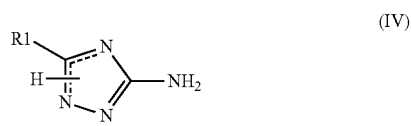

(IV)

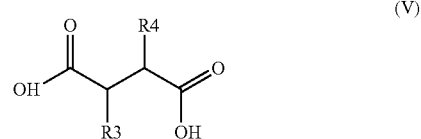

(V)

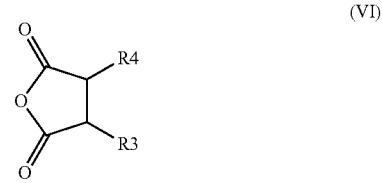

(VI)

in which $R_1$, $R_3$ and $R_4$ are as defined above.

Second Additive

The second additive comprises a quaternary ammonium salt obtained by reaction of a nitrogen containing compound comprising a tertiary amine function with a quaternizing agent. Examples of quaternary ammonium salts and the process for the preparation thereof are described in U.S. Pat. Nos. 4,253,980, 3,778,371, 4,171,959, 4,326,973, 4,338,206, 5,254,138 and PCT Patent Publication No. WO2010/132259, cited by way of examples and/or incorporated by reference in the present application.

According to a first particular embodiment of the invention, the nitrogen containing compound (a) is selected from the product of reaction of an acylating agent substituted with a hydrocarbon group, with a compound comprising at least one tertiary amine group and a group selected from the primary and secondary amines or the alcohols. The nitrogen-containing compound (a) is preferably the product of reaction of an acylating agent substituted with a hydrocarbon group, with a compound comprising both an oxygen atom or a nitrogen atom capable of condensing with said acylating agent, and a tertiary amine group. The acylating agent is, advantageously, selected from the mono- or polycarboxylic acids substituted with a hydrocarbon group and their derivatives, alone or in a mixture. The acylating agent is, for example, selected from the succinic, phthalic and propionic acids substituted with a hydrocarbon group.

The hydrocarbon substituent of the acylating agent preferably comprises at least 8, preferably at least 12 carbon atoms, for example between 30 or 50 carbon atoms. Said hydrocarbon substituent may comprise up to approximately 200 carbon atoms. The hydrocarbon substituent of the acylating agent preferably has a number-average molecular weight ($M_n$) comprised between 170 and 2800, for example between 250 and 1500, more preferably between 500 and 1500, and even more preferably between 500 and 1100. A range of values of $M_n$ comprised between 700 and 1300 is particularly preferred, for example from 700 to 1000.

As examples of hydrocarbon groups substituting the acylating agent, we may mention the n-octyl, n-decyl, n-dodecyl, tetrapropenyl, n-octadecyl, oleyl, octadecyl or triacontyl groups. The hydrocarbon substituent of the acylating agent may be obtained from homo- or inter-polymers (for example copolymers, terpolymers) of mono- and diolefins having from 2 to 10 carbon atoms, for example from ethylene, propylene, 1-butene, isobutene, butadiene, isoprene, 1-hexene or 1-octene. Preferably, these olefins are 1-mono-olefins. The hydrocarbon substituent of the acylating agent may also be derivatives of halogenated analogues (for example chlorinated or brominated) of these homo- or inter-polymers. According to a variant, the hydrocarbon substituent of the acylating agent may be obtained from other sources, for example starting from monomers of alkenes of high molecular weight (for example, 1-tetracontene) and their chlorinated or hydrochlorinated analogues, from aliphatic petroleum fractions, for example the paraffin waxes, their cracked, chlorinated and/or hydrochlorinated analogues, from white oils, from synthetic alkenes, for example produced by a Ziegler-Natta process (for example the polyethylene greases) and from other sources known to a person skilled in the art. Any unsaturation in the hydrocarbon group of the acylating agent may also be reduced or removed by hydrogenation by any known process.

By "hydrocarbon" group is meant any group having a carbon atom attached directly to the rest of the molecule and mainly having an aliphatic hydrocarbon character. Hydrocarbon groups according to the invention may also contain non-hydrocarbon groups. For example, they may contain up to one non-hydrocarbon group per ten carbon atoms provided that the non-hydrocarbon group does not significantly alter the mainly hydrocarbon character of the group. We may mention, as examples of such groups that are well known to a person skilled in the art, the hydroxyl groups, the halogens (in particular the chloro and fluoro groups), the alkoxy, alkylmercapto, and alkylsulphoxy groups.

Nevertheless, the hydrocarbon substituents not containing such non-hydrocarbon groups, and having a purely aliphatic hydrocarbon character, will be preferred. The hydrocarbon substituent of the acylating agent is preferably essentially saturated, i.e. it does not contain more than one unsaturated carbon-carbon bond for each section of ten carbon-carbon single bonds present. The hydrocarbon substituent of the acylating agent advantageously contains not more than one non-aromatic unsaturated carbon-carbon bond to every 50 carbon-carbon bonds present.

According to a preferred particular embodiment, the hydrocarbon substituent of the acylating agent is preferably selected from the polyisobutenes known in the prior art. Advantageously, the acylating agent substituted with a hydrocarbyl group is a polyisobutenyl succinic anhydride (PIBSA). The preparation of polyisobutenyl succinic anhydrides (PIBSA) is widely described in the literature. The methods comprising the reaction between polyisobutenes (FIB) and maleic anhydride described in U.S. Pat. Nos. 3,361,673 and 3,018,250 or the process comprising the reaction of a halogenated, in particular chlorinated, polyisobutene (FIB) with maleic anhydride (U.S. Pat. No. 3,172,892) may be mentioned by way of example.

According to a variant, the polyisobutenyl succinic anhydride may be prepared by mixing a polyolefin with maleic anhydride and then passing chlorine through the mixture (GB949 981). In particular, the polyisobutenes (PIBs) referred to as highly reactive will be used. By "highly reactive polyisobutenes (PIBs)" is meant polyisobutenes (FIB) in which at least 50%, preferably at least 70% or more, of the terminal olefinic double bonds are of the vinylidene type as described in document EP0565285. In particular, the preferred PIBs are those having more than 80 mol % and up to 100 mol % of terminal vinylidene groups as described in document EP1344785.

Other hydrocarbon groups comprising an internal olefin, for example such as those described in application WO2007/015080, may also be used. Internal olefin means any olefin mainly containing a non-alpha double bond, which is a beta olefin or with a higher position. Preferably, these materials are essentially beta-olefins or olefins of higher position, for example containing less than 10% by mass of alpha-olefin, advantageously less than 5% by mass or less than 2% by mass. The internal olefins may be prepared by isomerization of alpha-olefins by any known process.

The compound comprising both an oxygen atom or a nitrogen atom capable of condensing with the acylating agent and a tertiary amine group may, for example, be selected from the group consisting of: N,N-dimethylaminopropylamine, N,N-diethylaminopropylamine, N,N-dimethylaminoethylamine. Said compound may moreover be selected from the heterocyclic compounds substituted with alkylamines such as 1-(3-aminopropyl)imidazole and 4-(3-aminopropyl)morpholine, 1-(2-aminoethyl)piperidine, 3,3-diamino-N-methyldipropylamine, and 3'3-bisamino(N,N-dimethylpropylamine). The compound comprising both an oxygen atom or a nitrogen atom capable of condensing with the acylating agent and a tertiary amine group may also be selected from the alkanolamines, including, but not limited to, triethanolamine, trimethanolamine, N,N-dimethylaminopropanol, N,N-dimethylaminoethanol, N,N-diethylaminopropanol, N,N-diethylaminoethanol, N,N-diethylaminobutanol, N,N,N-tris(hydroxyethyl)amine, N,N,N-tris(hydroxymethyl)amine, N,N,N-tris(aminoethyl)amine, N,N-dibutylaminopropylamine and N,N,N'-trimethyl-N'-hydroxyethyl-bisaminoethyl ether, N,N-bis(3-dimethylaminopropyl)-N-isopropanolamine, N-(3-dimethylamino-propyl)-N,N-diisopropanolamine, N'-(3-(dimethylamino)propyl)-N,N-dimethyl-1,3-propanediamine; 2-(2-dimethylaminoethoxy)ethanol and N,N,N'-trimethylaminoethylethanolamine.

According to a particular embodiment, the nitrogen containing compound (a) comprises a product of reaction of an acylating agent substituted with a hydrocarbon group and an amine of the following formula (VII) or (VIII):

(VII)

(VIII)

in which:

$R_6$ and $R_7$ are identical or different and represent, independently of one another, an alkyl group having from 1 to 22 carbon atoms;

X is an alkylene group having from 1 to 20 carbon atoms;

m is an integer between 1 and 5;

n is an integer between 0 and 20; and $R_8$ is a hydrogen atom or a $C_1$ to $C_{22}$ alkyl group.

When the nitrogen containing compound (a) comprises an amine of formula (VII), $R_8$ is advantageously a hydrogen atom or a $C_1$ to $C_{16}$ alkyl group, preferably a $C_1$ to $C_{10}$ alkyl group, even more preferably a $C_1$ to $C_6$ alkyl group. $R_8$ may, for example, be selected from the group consisting of hydrogen, methyl, ethyl, propyl, butyl and isomers thereof. Preferably $R_8$ is a hydrogen atom. When the nitrogen containing compound (a) comprises an amine of formula (VIII), m is preferably equal to 2 or 3, more preferably equal to 2; n is preferably an integer between 0 and 15, more preferably between 0 and 10, even more preferably between 0 and 5. Advantageously, n is 0 and the compound of formula (VIII) is an alcohol. According to a preferred embodiment, the nitrogen containing compound (a) is the product of reaction of the acylating agent substituted with a hydrocarbon group with the diamine of formula (VII).

$R_6$ and $R_7$ may represent, independently of one another, a $C_1$ to $C_{16}$ alkyl group, preferably a $C_1$ to $C_{10}$ alkyl group to form an alkyl group. $R_6$ and $R_7$ may represent, independently of one another, a methyl, ethyl, propyl, butyl, pentyl, hexyl, heptyl, octyl group or isomers thereof. Advantageously, $R_6$ and $R_7$ represent, independently of one another, a $C_1$ to $C_4$ group, preferably a methyl group.

X preferably represents an alkylene group having 1 to 16 carbon atoms, preferably from 1 to 12 carbon atoms, more preferably from 1 to 8 carbon atoms, for example from 2 to 6 carbon atoms or from 2 to 5 carbon atoms. X advantageously represents an ethylene, propylene or butylene group, in particular a propylene group. The quaternary ammonium salt of the second additive may for example be obtained by the preparation process described in international application WO2006/135881.

According to a preferred variant, the nitrogen containing compound (a) is the product of reaction of a derivative of succinic acid substituted with a hydrocarbon group, preferably a polyisobutenyl succinic anhydride, and an alcohol or an amine also comprising a tertiary amine group. Under certain conditions, the succinic acid derivative substituted with a hydrocarbon group reacts with the amine also comprising a tertiary amine group to form a succinimide (closed form). According to a variant, reaction of the succinic acid derivative and the amine may lead under certain conditions to a succinamide, i.e. a compound comprising an amide group and a carboxylic acid group (open form).

According to another variant, an alcohol also comprising a tertiary amine group reacts with the succinic acid derivative to form an ester. This ester molecule also comprises a free carboxyl group —$CO_2H$ (open form). Thus, in certain embodiments the nitrogen-containing compound (a) may be the product of reaction of a succinic acid derivative and an amine or an alcohol which is an ester or an amide and which further also comprises an unreacted carboxyl group —$CO_2H$ (open form).

According to a second particular embodiment of the invention, the nitrogen containing compound (b) is selected from a product of the Mannich reaction comprising a tertiary amine group. The preparation of quaternary ammonium salts formed from a nitrogen containing compound, in particular from nitrogen containing compound (b), is described for example in U.S. Patent Publication No. 2008/0052985.

The product of the Mannich reaction comprising a tertiary amine group is prepared by reaction of a phenol substituted with a hydrocarbon group, an aldehyde and an amine. The hydrocarbon substituent of said phenol may contain from 6 to 400 carbon atoms, advantageously from 30 to 180 carbon atoms, for example from 10 to 110, or from 40 to 110 carbon atoms. The hydrocarbon substituent of said phenol may be derived from an olefin or a polyolefin. By way of example, the alpha-olefins such as n-1-decene may be mentioned.

The polyolefins forming the hydrocarbon substituent of the phenol may be prepared by polymerization of monomers of olefins by any known process of polymerization. Advantageously, the polyolefins are selected from the polyisobutylenes having a number-average molecular weight (Mn) between 400 and 3000, preferably between 400 and 2500, more preferably between 400 and 1500 or between 500 and 1500. The phenol substituted with a hydrocarbon group may be prepared by alkylation of phenol with an olefin or polyolefin described above, such as a polyisobutylene or polypropylene, using conventional methods of alkylation.

According to a variant, the phenol may be substituted with one or more alkyl groups of low molecular weight, for example a phenol bearing one or more alkyl chains with fewer than 28 carbon atoms, preferably with fewer than 24 carbon atoms, more preferably with fewer than 20 carbon atoms, even more preferably with fewer than 18 carbon atoms, even more preferably with 16 carbon atoms and even more preferably with 14 carbon atoms. A monoalkyl phenol preferably having from 4 to 20 carbon atoms, preferably from 6 to 18, more preferably from 8 to 16, even more preferably from 10 to 14 carbon atoms, for example a phenol substituted with a $C_{12}$ alkyl group, will be preferred. The aldehyde used for forming the product of the Mannich reaction may comprise from 1 to 10 carbon atoms, and is generally formaldehyde or its reactive equivalents such as Formalin (methanol and formaldehyde) or para-formaldehyde.

The amine used for forming the product of the Mannich reaction may be a monoamine or a polyamine. As non-limitative examples, ethylamine, dimethylamine, diethylamine, n-butylamine, dibutylamine, allylamine, isobutylamine, cocoamine, stearylamine, laurylamine, methyllaurylamine, oleylamine, N-methyloctylamine, dodecylamine, diethanolamine, morpholine and octadecylamine may be mentioned as monoamines.

The polyamines are selected from the compounds comprising two or more amine groups. As non-limitative examples, the polyalkylene polyamines in which the alkylene group has for example from 1 to 6, preferably from 1 to 4, more preferably from 2 to 3 carbon atoms, may be mentioned as polyamines. The preferred polyamines are the polyethylene-polyamines. The polyamine may comprise from 2 to 15 nitrogen atoms, preferably from 2 to 10 nitrogen atoms, preferably 2 to 8 nitrogen atoms.

According to a preferred variant, the amine used for forming the product of the Mannich reaction comprises a diamine, which preferably comprises a primary or secondary amine function taking part in the Mannich reaction and a tertiary amine. In a particular embodiment, the nitrogen-containing compound (b) comprises the product obtained directly by the Mannich reaction, and comprising a tertiary amine. For example, the amine comprises a single primary or secondary amine function that is involved in the Mannich reaction and a quaternizable tertiary amine.

According to a variant, the amine comprises a primary or secondary amine capable of taking part in the Mannich reaction, and a quaternizable tertiary amine. According to another variant, the nitrogen containing compound (b) may be obtained by a Mannich reaction and then subjected to a reaction for obtaining a tertiary amine, for example a process using an intermediate comprising a secondary amine and obtained by the Mannich reaction, which is then modified, for example by alkylation, to give a secondary amine.

According to a third particular embodiment of the invention, the nitrogen containing compound (c) is selected from the amines substituted with a polyalkene group (also called polyalkylene) having at least one tertiary amine group. Preparation of quaternary ammonium salts formed from a nitrogen containing compound (c) is described for example in U.S. Patent Publication No 2008/0113890. The amines substituted with a polyalkene group having at least one tertiary amine group may be derived from polyolefin and amine, for example ammonia, the monoamines, the polyamines, alone or in combination. Said amines may be prepared by any known process, for example those described in U.S. Patent Publication No. 2008/0113890.

By way of non-limitative examples, reaction of a halogenated olefinic polymer with an amine; reaction of a hydroformylated olefin with a polyamine followed by hydrogenation of the reaction product; conversion of a polyalkene to the corresponding epoxide followed by conversion of the epoxide to aminated polyalkene by reductive amination; hydrogenation of a β-aminonitrile; and hydroformylation of a polybutene or polyisobutylene in the presence of a catalyst, CO and $H_2$ at high pressure and temperature may be mentioned. The olefinic monomers from which the olefinic polymers are derived comprise the polymerizable olefinic monomers characterized by the presence of one or more ethylenic unsaturations, for example ethylene, propylene, 1-butene, isobutene, 1-octene, 1,3-butadiene and isoprene. The olefinic monomers are generally polymerizable terminal olefins. However, polymerizable internal olefinic monomers may also be used for forming the polyalkenes.

As non-limitative examples, the terminal and internal olefinic monomers that may be used for preparing the polyalkenes by any known process are: ethylene; propylene; the butenes, including 1-butene, 2-butene and isobutylene; 1-pentene; 1-hexene; 1-heptene; 1-octene; 1-nonene; 1-decene; 2-pentene; propylene tetramer; diisobutylene; isobutylene trimer; 1,2-butadiene; 1,3-butadiene; 1,2-pentadiene; 1,3-pentadiene; 1,4-pentadiene; isoprene; 5-hexadiene; 2-methyl-5-propyl-1-hexene; 3-pentene; 4-octene and 3,3-dimethyl-1-pentene. Amines substituted with derivatives of polyisobutylene will preferably be selected.

The amines used for preparing the amines substituted with a polyalkene group may be selected from ammonia, the monoamines, the polyamines alone or in mixtures, including mixtures of different monoamines, mixtures of different polyamines, and mixtures of monoamines and polyamines (including the diamines). Said amines comprise aliphatic, aromatic, and heterocyclic hydrocarbons and the carbocyclic amines. The monomers and the polyamines advantageously comprise at least one primary or secondary amine.

The monoamines are generally substituted with a hydrocarbon group having from 1 to approximately 50 carbon atoms, preferably from 1 to 30 carbon atoms. The saturated aliphatic hydrocarbon substituents are particularly preferred. As examples, methylamine, ethylamine, diethylamine, 2-ethylhexylamine, di(2-ethylhexyl)amine, n-butylamine, di-n-butylamine, allylamine, isobutylamine, cocoamine, stearylamine, laurylamine, methyllaurylamine and oleylamine may be mentioned. The aromatic monoamines comprise the monoamines in which a carbon atom having an aromatic cyclic structure is attached directly to the amine nitrogen. Examples of aromatic monoamines comprise aniline, di(para-methylphenyl)amine, naphthylamine and N-(n-butyl)aniline.

Examples of aromatic monoamines substituted with aliphatic, cycloaliphatic and heterocyclic hydrocarbon groups comprise para-dodecylaniline, cyclohexyl-naphthylamine and thienylaniline, respectively. The monoamines according to the present invention also comprise the hydroxyamines. By way of example, ethanolamine, di-3-propanolamine, 4-hydroxybutylamine, diethanolamine and N-methyl-2-hydroxypropylamine may be mentioned.

The polyamines may also be selected from the amines substituted with polyalkene groups. The polyamine may be aliphatic, cycloaliphatic, heterocyclic or aromatic. By way of example, the alkylene polyamines, the polyamines with hydroxy substitution, the arylpolyamines and the heterocyclic polyamines may be mentioned. The ethylenic polyamines are preferred for reasons of cost and efficiency.

The polyamines with hydroxy substitution comprise the hydroxyalkylated alkene polyamines having one or more hydroxyalkyl substituents on the nitrogen atoms and that may be prepared by reaction of the alkene polyamines with one or more alkene oxides. By way of example, N-(2-hydroxyethyl)ethylenediamine, N,N-bis(2-hydroxyethyl) ethylenediamine, 1-(2-hydroxyethyl)piperazine, monohydroxypropyl-diethylenetriamine, dihydroxypropyl-tetraethylenepentamine and N-(3-hydroxybutyl)-tetramethylenediamine may be mentioned. The arylpolyamines are analogues of the aromatic monoamines described above except for the presence in their structure of another amino nitrogen. By way of example, N,N'-di-n-butyl-para-phenylenediamine and bis(para-aminophenyl) methane may be mentioned.

The mono- and heterocyclic polyamines will be known to a person skilled in the art. By way of example, N-aminopropylmorpholine, N-aminoethylpiperazine, and N,N'-diaminoethylpiperazine may be mentioned. The hydroxy-heterocyclic polyamines may also be used, for example N-(2-hydroxyethyl)cyclohexylamine, 3-hydroxycyclopentylamine, parahydroxy-aniline and N-hydroxyethylpiperazine. Examples of amines substituted with polyalkene groups may comprise: polypropylene amine, polybutene amine, N,N-dimethyl-polyisobutylene-amine, N-polybutene-morpholine, N-polybutene-ethylenediamine, N-polypropylene trimethylenediamine, N-polybutene-diethylenetriamine, N',N'-polybutene-tetraethylenepentamine and N,N-dimethyl-N'-polypropylene-1,3-propylenediamine. The number-average molecular weight ($M_n$) of the amines with polyalkene substitution may range from 500 to 5000, preferably from 500 to 3000, for example from 1000 to 1500.

All the amines with polyalkene substitution described above that are primary or secondary amines may be alkylated to form tertiary amine functions using alkylating agents by any known process. The quaternary ammonium salt of the second additive according to the present invention is obtained directly by reaction between the nitrogen-containing compound described above comprising a tertiary amine function and a quaternizing agent. According to a particular embodiment, the quaternizing agent is selected from the group constituted by the dialkyl sulphates, the carboxylic acid esters; the alkyl halides, the benzyl halides, the hydrocarbon carbonates, and the hydrocarbon epoxides optionally mixed with an acid, alone or in a mixture.

For fuel applications, it is often desirable to reduce the content of halogen, sulphur and the phosphorus-containing compounds. Thus, if a quaternizing agent containing such an element is used, it may be advantageous to carry out a subsequent reaction for exchange of the counter-ion. For example, a quaternary ammonium salt formed by reaction with an alkyl halide may then be reacted with sodium hydroxide and the sodium halide salt may be removed by filtration.

The quaternizing agent may comprise halides such as chloride, iodide or bromide; hydroxides; sulphonates; bisulphites; alkyl sulphates such as dimethyl sulphate; sulphones; phosphates; $C_1$-$C_{12}$ alkyl phosphates; $C_1$-$C_{12}$ dialkyl phosphates; borates; $C_1$-$C_{12}$ alkyl borates; nitrites; nitrates; carbonates; bicarbonates; alkanoates; $C_1$-$C_{12}$ O,O-dialkyldithiophosphates, alone or in a mixture. According to a particular embodiment, the quaternizing agent may be derived from dialkyl sulphates such as dimethyl sulphate, from N-oxides, from sulphones such as propane- and butane-sulphone, from alkyl halides, from acyl or from aralkyl such as methyl and ethyl chloride, benzyl bromide, iodide or chloride, and the hydrocarbon carbonates (or alkyl carbonates). If the acyl halide is benzyl chloride, the aromatic ring is optionally substituted with one or more alkyl or alkenyl groups. The hydrocarbon groups (alkyls) of the hydrocarbon carbonates may contain from 1 to 50, from 1 to 20, from 1 to 10 or 1 to 5 carbon atoms per group.

According to a particular embodiment, the hydrocarbon carbonates contain two hydrocarbon groups, which may be identical or different. As an example of hydrocarbon carbonates, dimethyl or diethyl carbonate may be mentioned.

According to a particular embodiment, the quaternizing agent is selected from the hydrocarbon epoxides represented by the following formula (IX):

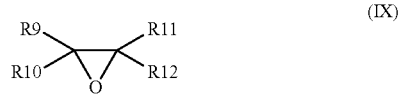
(IX)

in which $R_9$, $R_{10}$, $R_{11}$ and $R_{12}$ may be identical or different and represent, independently, a hydrogen atom or a $C_1$-$C_{50}$ hydrocarbon group. By way of non-limitative example, styrene oxide, ethylene oxide, propylene oxide, butylene oxide, stilbene oxide and the $C_1$-$C_{50}$ epoxides may be mentioned. Styrene oxide is particularly preferred.

Typically, hydrocarbon epoxides of this kind are used as quaternizing agent in combination with an acid, for example with acetic acid. Nevertheless, in the particular embodiment described above involving the nitrogen-containing compound (a) constituted by a substituted succinamide comprising both an amide or ester function and a carboxylic acid function (open form), the hydrocarbon epoxide may be used alone as quaternizing agent without additional acid. Without being bound by this hypothesis, it would seem that the presence of the carboxylic acid function in the molecule promotes formation of the quaternary ammonium salt.

In such a particular embodiment, not using additional acid, a protic solvent is used for preparing the quaternary ammonium salt. By way of example, the protic solvents such as water, the alcohols (including the polyhydric alcohols) may be used alone or in a mixture. The preferred protic solvents have a dielectric constant greater than 9. The appropriate quaternary ammonium salts prepared from amides or esters and derivatives of succinic acid are described in WO2010/132259.

According to a particular embodiment, the quaternizing agent comprises a compound of formula (X):

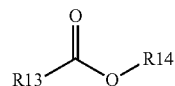
(X)

in which $R_{13}$ is an alkyl, alkenyl, aryl and aralkyl group, optionally substituted, and $R_{14}$ is a $C_1$ to $C_{22}$ alkyl, aryl or alkylaryl group.

The compound of formula (X) is a carboxylic acid ester capable of reacting with a tertiary amine to form a quaternary ammonium salt. Compounds of formula (X) are selected, for example, from the esters of carboxylic acids having a pKa of 3.5 or less. The compound of formula (X) is preferably selected from the esters of substituted aromatic carboxylic acid, of α-hydroxycarboxylic acid and of polycarboxylic acid.

According to a particular embodiment, the ester is an ester of substituted aromatic carboxylic acid of formula (X) in which $R_{13}$ is a substituted aryl group. Preferably, $R_{13}$ is a substituted aryl group having 6 to 10 carbon atoms, preferably a phenyl or naphthyl group, more preferably a phenyl group. $R_{13}$ is advantageously substituted with one or more groups selected from the carboalkoxy, nitro, cyano, hydroxy, $SR_{15}$ and $NR_{15}R_{16}$ radicals. Each of the $R_{15}$ and $R_{16}$ groups may be a hydrogen atom or an alkyl, alkenyl, aryl or carboalkoxy group, optionally substituted. Each of the $R_{15}$ and $R_{16}$ groups represents, advantageously, a hydrogen atom or a $C_1$ to $C_{22}$ alkyl group, optionally substituted, preferably a hydrogen atom or a $C_1$ to $C_{16}$ alkyl group, more preferably a hydrogen atom or a $C_1$ to $C_{10}$ alkyl group, even more preferably a hydrogen atom or a $C_1$ to $C_4$ alkyl group. $R_{15}$ is preferably a hydrogen atom and $R_{16}$ a hydrogen atom or a $C_1$ to $C_4$ group. Advantageously, $R_{15}$ and $R_{16}$ are both a hydrogen atom.

According to a particular embodiment, $R_{13}$ is an aryl group substituted with one or more groups selected from the hydroxyl, carboalkoxy, nitro, cyano and $NH_2$ radicals. $R_{13}$ may be a polysubstituted aryl group, for example trihydroxyphenyl. Advantageously, $R_{13}$ is a monosubstituted aryl group, preferably ortho-substituted. $R_{13}$ is, for example, substituted with a group selected from the OH, $NH_2$, $NO_2$ or COOMe radicals, preferably OH or $NH_2$. $R_{13}$ is preferably a hydroxy-aryl group, in particular 2-hydroxyphenyl. According to a particular embodiment, $R_{14}$ is an alkyl or alkylaryl group. $R_{14}$ may be a $C_1$ to $C_{16}$, preferably $C_1$ to $C_{10}$, advantageously $C_1$ to $C_8$ alkyl group. $R_{14}$ may be a $C_1$ to $C_{16}$, preferably $C_1$ to $C_{10}$, advantageously $C_1$ to $C_8$ alkylaryl group. $R_{14}$ may for example be selected from the methyl, ethyl, propyl, butyl, pentyl, benzyl groups or isomers thereof. Preferably, $R_{14}$ is a benzyl or methyl group, more preferably methyl.

A particularly preferred compound of formula (X) is methyl salicylate. According to a particular embodiment, the compound of formula (X) is an ester of an α-hydroxycarboxylic acid of the following formula:

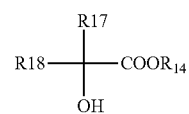

in which $R_{17}$ and $R_{18}$, are identical or different, and are selected independently from the group consisting of the hydrogen atom, the alkyl, alkenyl, aryl or aralkyl groups. Such compounds are described for example in document EP 1254889.

Examples of compounds of formula (X) in which $R_{13}COO$ is the residue of an α-hydroxycarboxylic acid comprise the methyl, ethyl, propyl, butyl, pentyl, hexyl, phenyl, benzyl or allyl esters of 2-hydroxy-isobutyric acid; the methyl, ethyl, propyl, butyl, pentyl, hexyl, benzyl, phenyl or allyl esters of 2-hydroxy-2-methylbutyric acid; the methyl, ethyl, propyl, butyl, pentyl, hexyl, benzyl, phenyl or allyl esters of 2-hydroxy-2-ethylbutyric acid; the methyl, ethyl, propyl, butyl, pentyl, hexyl, benzyl, phenyl or allyl esters of lactic acid and the methyl, ethyl, propyl, butyl, pentyl, hexyl, allyl, benzyl or phenyl esters of glycolic acid. From the above, the preferred compound is methyl-2-hydroxyisobutyrate. According to a particular embodiment, the compound of formula (X) is an ester of a polycarboxylic acid comprising the dicarboxylic acids and the carboxylic acids having more than two acid functions. The carboxyl functions are preferably all in the esterified form. The preferred esters are the $C_1$ to $C_4$ alkyl esters.

The compound of formula (X) may be selected from the oxalic acid diesters, the phthalic acid diesters, the maleic acid diesters, the malonic acid diesters or the citric acid diesters. Preferably, the compound of formula (X) is dimethyl oxalate. According to a preferred variant, the compound of formula (X) is a carboxylic acid ester having a pKa below 3.5. For the cases where the compound comprises more than one acid group, reference will be made to the first dissociation constant.

The compound of formula (X) may be selected from one or more carboxylic acid esters selected from oxalic acid, phthalic acid, salicylic acid, maleic acid, malonic acid, citric acid, nitrobenzoic acid, aminobenzoic acid and 2,4,6-trihydroxybenzoic acid. The preferred compounds of formula (X) are dimethyl oxalate, 2-methyl nitrobenzoate and methyl salicylate. According to an especially preferred embodiment, the quaternary ammonium salt according to the invention is formed by reaction of 2-methylhydroxybenzoate or styrene oxide with the reaction product of a polyisobutenyl succinic anhydride the polyisobutylene group (PIB) of which has a number-average molecular weight (Mn) between 700 and 1000 and dimethyl-aminopropylamine. According to a preferred particular embodiment, the composition of additives comprises the first additive as described above preferably comprising a triazole derivative of formula (II) and/or (III) and the second additive comprising a quaternary ammonium salt obtained from the nitrogen-containing compound (a) described above.

Third Additive

According to a particular embodiment, the composition of additives described above may further comprise a third additive. The third additive comprises at least 50% by mass of a compound A selected from the partial esters of polyols and of saturated or unsaturated, linear or branched, cyclic or acyclic, $C_4$ to $C_{36}$, preferably $C_{12}$-$C_{24}$, more preferably $C_{16}$-$C_{20}$, monocarboxylic aliphatic hydrocarbons, said partial esters being able to be used alone or in a mixture.

Compound A preferably comprises x ester units, y hydroxyl units and z ether units, x, y and z being integers such that x varies from 1 to 10, y varies from 1 to 10, and z varies from 0 to 6. According to a particular embodiment, x varies from 1 to 10, y varies from 3 to 10, and z varies from 0 to 6. According to another particular embodiment x varies from 0 to 4, y varies from 1 to 7 and z varies from 1 to 3. Advantageously, x varies from 2 to 4.

The synthesis of partial esters of polyols is known per se; they may for example be prepared by esterification of fatty acid(s) and of linear and/or branched polyols optionally comprising (hetero)cycles with 5 to 6 atoms bearing hydroxyl functions. Generally this type of synthesis leads to a mixture of mono-, di-, tri- and optionally of tetra-esters as well as small quantities of fatty acid(s) and unreacted polyols. According to a particular embodiment, compound A is obtained by esterification of one or more $C_4$ to $C_{36}$ fatty acid(s), preferably $C_{10}$-$C_{24}$, more preferably $C_{12}$-$C_{24}$, optionally comprising one or more ethylenic bonds, and of a linear or branched, cyclic or acyclic polyol, optionally comprising a heterocycle with 5 to 6 atoms, preferably a heterocycle with 4 to 5 carbon atoms and one oxygen atom, substituted with hydroxyl groups.

The fatty acids are selected advantageously from the group constituted by stearic, isostearic, linolenic, oleic, linoleic, behenic, arachidonic, ricinoleic, palmitic, myristic, lauric, and capric acids, used alone or in a mixture. The fatty acids may originate from transesterification or saponification of vegetable oils and/or of animal fats. The preferred vegetable oils and/or animal fats will be selected as a function of their concentration of oleic acid. Reference may be made for example to Table 6.21 of chapter 6 of the work Carburants & Moteurs [Fuels & Engines] by J. C. Guibet and E. Faure, 2007 edition, which gives the compositions of several vegetable oils and animal fats. The fatty acids may also originate from fatty acids derived from tall oil (Tall Oil Fatty Acids), which comprise a majority quantity of fatty acids, typically greater than or equal to 90% by mass, as well as smaller quantities of resin acids and unsaponifiables, i.e. in quantities generally below 10%.

The polyol will preferably be selected from the linear or branched polyols comprising more than three hydroxyl functions and the polyols comprising at least one ring of 5 or 6 atoms, preferably a heterocycle with 4 to 5 carbon atoms and one oxygen atom, optionally substituted with hydroxyl groups, used alone or in a mixture. According to a preferred variant, the polyol is selected from the polyols comprising at least one ring of 5 or 6 atoms, preferably a heterocycle with 4 to 5 carbon atoms and one oxygen atom, optionally substituted with hydroxyl groups, used alone or in a mixture. According to another variant, the polyol is selected from the polyols comprising at least two heterocycles with 4 or 5 carbon atoms and one oxygen atom, linked by the formation of an acetal bond between a hydroxyl function of each ring, said heterocycles optionally being substituted with hydroxyl groups. The polyol is, in particular, selected from the group consisting of erythritol, xylitol, arabitol, ribitol, sorbitol, maltitol, isomaltitol, lactitol, volemitol, mannitol, pentaerythritol, 2-hydroxymethyl-1,3-propandediol, 1,1,1-tri(hydroxymethyl)ethane, trimethylolpropane, sorbitan and the carbohydrates such as sucrose, fructose, maltose, glucose and saccharose, preferably sorbitan.

According to a particular embodiment, compound A is selected from the sorbitan partial esters, preferably the sorbitan di-, mono- and triesters, used alone or in a mixture. According to a variant, compound A is selected from the sorbitan partial esters comprising more than 40% by mass of sorbitan triesters, preferably more than 50% by mass. According to another variant, compound A is selected from the sorbitan partial esters comprising more than 20% by mass of sorbitan monoesters and/or more than 20% by mass of sorbitan diesters, preferably more than 20% by mass of sorbitan monoesters and/or more than 30% by mass of sorbitan diesters, more preferably more than 25% by mass of sorbitan monoesters and/or more than 35% by mass of sorbitan diesters.

According to another particular embodiment, compound A is selected from the monoester(s) and/or diester(s) of polyglycerols derived from fatty acid(s), having more than 50% by number of fatty chains comprising between 12 and 24 carbon atoms. Such polyglycerols, described in document WO2013/120985, are cited by way of example and/or incorporated by reference in the present application. Compound A is preferably selected from the monoester(s) and/or diester(s) of diglycerol and/or of triglycerol.

In particular, the partial esters of diglycerol and/or of triglycerol comprise at least 50% by mass of monoester(s) and/or of diester(s) of oleic acid and of diglycerol, thus of diglycerol mono-oleate(s) (DGMO) and/or of diglycerol dioleate(s) (DGDO), either at least 50% by mass of mono- and/or diester(s) of oleic acid and of triglycerol, or at least 50% by mass of mono- and/or diester(s) of oleic acid and of diglycerol and/or of triglycerol. According to a particular embodiment, each of the first, second and third additives are constituted solely by their respective active ingredient, namely the triazole derivative in the case of the first additive, the quaternary ammonium salt in the case of the second additive and compound A in the case of the third additive. According to a particular embodiment, the composition of additives comprises the first additive, the quaternary ammonium salt obtained from the nitrogen-containing compound (a) and a compound A selected from the sorbitan partial esters described above, preferably a sorbitan triester.

According to a variant, the composition of additives comprises the first additive, the quaternary ammonium salt obtained from the nitrogen containing compound (a) and a compound A selected from the monoesters and/or diesters of polyglycerols derived from fatty acid as described above. According to another particular embodiment, the composition of additives comprises the first additive, the quaternary ammonium salt obtained from the nitrogen-containing compound (b) and a compound A selected from the sorbitan partial esters described above, preferably a sorbitan triester. According to a variant, the composition of additives comprises the first additive, the quaternary ammonium salt obtained from the nitrogen-containing compound (b) and a compound A selected from the monoesters and/or diesters of polyglycerols derived from fatty acid as described above. According to another particular embodiment, the composition of additives comprises the first additive, the quaternary ammonium salt obtained from the nitrogen-containing compound (c) and a compound A selected from the sorbitan partial esters described above, preferably a sorbitan triester. According to a variant, the composition of additives comprises the first additive, the quaternary ammonium salt obtained from the nitrogen-containing compound (c) and a compound A selected from the monoesters and/or diesters of polyglycerols derived from fatty acid as described above.

The composition of additives described above may also comprise one or more other conventional additives. As examples, we may mention antioxidants, combustion improvers, corrosion inhibitors, low temperature performance additives, dyes, demulsifiers, metal deactivators, antifoaming agents, cetane number improvers, lubricity additives, co-solvents and compatibilizing agents. Non exhaustively, the other functional additive or additives may be selected from:

combustion improvers; the cetane number improvers may be mentioned, in particular (but non limitatively) selected from the alkyl nitrates, preferably 2-ethylhexyl nitrate, the aryl peroxides, preferably benzyl peroxide, and the alkyl peroxides, preferably ditert-butyl peroxide;

antioxidant additives, such as aliphatic and aromatic amines, the hindered phenols, such as BHT, BHQ;

demulsifiers;

antistatic additives or conductivity improvers;

dyes;

antifoaming additives, in particular (but non limitatively) selected for example from the polysiloxanes, the alkoxylated polysiloxanes, and the amides of fatty acids derived from vegetable or animal oils; examples of such additives are given in EP861182, EP663000, EP736590;

anticorrosion additives such as the ammonium salts of carboxylic acids;

metal chelating and/or sequestering agents, such as the triazoles, the disalicylidene alkylene diamines, and in particular N,N'-bis(salicylidene)-1,3-propanediamine;

low temperature performance additives and in particular cloud point improvers, in particular (but non limitatively) selected from the group constituted by the long-chain olefin/(meth)acrylic ester/maleimide terpolymers, and the polymers of esters of fumaric/maleic acids. Examples of such additives are given in EP71513, EP100248, FR2528051, FR2528051, FR2528423, EP112195, EP172758, EP271385, EP291367; the antisedimentation additives and/or paraffin dispersants in particular (but non limitatively) selected from the group constituted by the copolymers of (meth)acrylic acid/alkyl (meth)acrylate amidated by a polyamine, the alkenyl succinimides derived from polyamines, the derivatives of phthalamic acid and double-chain fatty amine; alkylphenol/aldehyde resins; examples of such additives are given in EP261959, EP593331, EP674689, EP327423, EP512889, EP832172; U.S. Patent Publication No. 2005/0223631; U.S. Pat. No. 5,998,530; WO93/14178; the multifunctional additives for low-temperature operation in particular selected from the group constituted by the polymers based on olefin and alkenyl nitrate as described in EP573490;

other additives improving low temperature performance and filterability (CFI), such as the EVA and/or EVP copolymers;

acidity neutralizers such as the cyclic alkylamines;

markers, in particular the markers imposed by the regulations, for example dyes specific to each type of fuel;

perfuming or odour-masking agents, such as those described in EP1 591514;

lubricity additives, anti-wear agents and/or friction modifiers other than those described above, in particular (but non limitatively) selected from the derivatives of mono- and polycyclic carboxylic acids.

The composition of additives according to the present invention may be incorporated in the fuel by any known process. By way of example, the composition of additives may be incorporated in the form of a concentrate comprising said composition and a solvent, compatible with the fuel, the composition being dispersed or dissolved in the solvent. Concentrates of this kind generally contain from 1 to 95%, preferably from 20 to 95% by mass of solvents. The composition of additives typically comprises between 5 and 99%, preferably between 5 and 80% by mass of additives.

The solvents are organic solvents, which generally contain hydrocarbon solvents. By way of examples of solvents, petroleum fractions, such as naphtha, kerosene, heating oil;

aliphatic and/or aromatic hydrocarbons such as hexane, pentane, decane, pentadecane, toluene, xylene, and/or ethylbenzene and the alkoxyalkanols such as 2-butoxyethanol and/or mixtures of hydrocarbons and optionally of co-solvents or compatibilizing agents, such as 2-ethylhexanol, decanol, isodecanol and/or isotridecanol may be mentioned.

The composition of additives as described above may be used as a fuel additive. In particular, the composition of additives according to the invention is particularly suitable for use in a diesel fuel having a sulphur content less than or equal to 500 ppm by mass, preferably comprising a bio diesel. The diesel fuels are liquid fuels for compression engines. By diesel fuel is meant fuels comprising middle distillates with a boiling point between 100 and 500° C.; their wax appearance temperature WAT is often greater than or equal to −20° C., and generally comprised between −15° C. and +10° C. These distillates are mixtures of bases that may be selected for example from distillates obtained by direct distillation of petroleum or of crude hydrocarbons, vacuum distillates, hydrotreated distillates, distillates originating from catalytic cracking and/or hydrocracking of vacuum distillates, distillates resulting from conversion processes of the ARDS type (by desulphurization of atmospheric residue) and/or from visbreaking.

The diesel fuels according to the invention may also contain light cuts such as the gasolines originating from distillation, from catalytic or thermal cracking units, alkylation, isomerization, desulphurization units, steam cracking units. Moreover, the diesel fuels may contain new sources of distillates, among which the following may in particular be mentioned:
  the heaviest cuts originating from processes of cracking and visbreaking with high concentrations of heavy paraffins, comprising more than 18 carbon atoms,
  the synthetic distillates resulting from gas conversion such as those resulting from the Fischer-Tropsch process,
  the synthetic distillates resulting from treatment of biomass of vegetable and/or animal origin, such as in particular NexBTL, used alone or in a mixture,
  the coker diesels.

The diesel fuel according to the invention may also comprise or be solely constituted by one or more biofuels. By biofuel is meant the fuels obtained from organic matter (biomass), in contrast to the fuels originating from fossil resources. By way of examples of known biofuels, bio diesels (also called biodiesels) and alcohols may be mentioned. The alcohols, such as methanol, ethanol, butanols, ethers (MTBE, ETBE, etc.) are generally used in a mixture with gasoline fuels, but sometimes with heavier fuels of the diesel type.

Biodiesel or bio gas oil is an alternative to the standard fuel for diesel engines. This biofuel is obtained from vegetable or animal oil (including used cooking oils) transformed by a chemical process called transesterification, causing this oil to react with an alcohol in order to obtain fatty acid esters. With methanol and ethanol, fatty acid methyl esters (FAME) and fatty acid ethyl esters (FAEE) are obtained respectively.

By way of examples of vegetable and/or animal oils and/or their esters, the Vegetable Oil or Fatty Acid Methyl or Ethyl Esters (VOME, VOEE, FAME, FAEE) may be mentioned; for the vegetable and/or animal oils, the hydrotreated and/or hydrocracked and/or hydrodeoxygenated (HDO) vegetable and/or animal oils may be mentioned. Mixtures of middle distillates of fossil origin and of bio diesel are generally denoted by the letter "B" followed by a number indicating the percentage of bio diesel contained in the diesel. Thus, a B99 contains 99% of bio diesel and 1% of middle distillates of fossil origin; B20, 20% of bio diesel and 80% of middle distillates of fossil origin etc. A distinction is therefore made between the diesel fuels of type B0, which do not contain oxygenated compounds, and the bio diesel of type Bx, which contain x % (v/v) of vegetable oil or fatty acid esters, most often methyl esters (VOME or FAME). When bio diesel is used alone in engines, the fuel is denoted by the term B100.

In the remainder of the present application, the term "diesel fuel" will be used in the broad sense to cover all the fuels described above. Diesel fuel preferably has a sulphur content less than or equal to 500 ppm by mass, advantageously less than or equal to 100 ppm by mass, and may reach a content less than or equal to 50 ppm by mass, or even less than or equal to 10 ppm by mass (this is case for current diesel fuels for vehicles, the sulphur content of which according to European standard EN 590 currently in force must be less than or equal to 10 ppm by mass). The diesel fuel advantageously comprises up to 30% by volume of bio diesel, preferably up to 20% by volume, more preferably up to 10% by volume.

The composition of additives is preferably incorporated in the fuel so as to obtain a concentration by mass of each additive contained in said composition in the range from 5 to 5000 ppm, preferably from 20 to 500 ppm, more preferably from 30 to 250 ppm in the fuel. The concentration by mass is calculated relative to the total mass of the fuel. In particular, the concentration by mass of each first and second additive and optionally third additive varies from 5 to 5000 ppm, and preferably between 20 and 500 ppm, more preferably between 30 and 250 ppm. A person skilled in the art will easily adapt the concentration of the composition of additives according to the invention as a function of optional dilution of the additives in a solvent, to obtain the desired concentration of each functional additive in the final fuel.

The fuel preferably comprises at least 5 ppm by mass, preferably at least 100 ppm by mass of the composition of additives according to the invention. It will be possible for up to 10% by mass, preferably up to 1% by mass, more preferably up to 0.5% by mass of additives, including the composition of additives, to be incorporated in a fuel. The mass ratio of the first to the second additive (first:second) is between 1:100 and 100:1, preferably between 1:10 and 10:1, even more preferably between 1:2 and 2:1. The mass ratio of the second to the third additive (second:third) is between 1:100 and 1:1, preferably between 1:10 and 1:1, even more preferably between 1:5 and 1:1.

The diesel fuel described above may be used in a diesel engine, to improve the performance of said engine, in particular to limit the deposits in said engine, preferably in a direct-injection engine, more preferably when the engine is equipped with a high-pressure injection system ("common-rail"). Use of such a fuel incorporating the composition of additives according to the present invention makes it possible to reduce the fuel consumption of the diesel engine ("Fuel Eco" effect), and in particular makes it possible to minimize the loss of power of said engine. The present invention also relates to a process for maintaining the cleanliness of a diesel engine ("keep-clean" effect) by limiting the deposits of soap and/or lacquer in the internal components of the injection systems of said engine and/or for cleaning the fouled internal parts of the injection system of said engine, by removing, at least partly, the deposits of soap and/or lacquer in said internal parts (curative "clean-up" effect). Said process comprises the combustion of a composition of additives according to the present invention in a diesel engine, in particular in a direct-injection engine, preferably with a high-pressure injection system ("common-rail").

EXAMPLES

Reagents
N,N-bis(2-ethylhexyl)-1,2,4-triazole-1-methanamine (CAS 91273-04-0)
Polyisobutenyl succinic anhydride (PIBSA) with number-average molecular weight Mn of 1100 (GPC) marketed by the company BASF under the trade name "Glissopal*SA®"
3-amino-1,2,4-triazole (CAS 61-82-5).

TABLE 1

Composition by mass of sorbitan partial esters SPE1 and SPE2, determined by gel permeation chromatography (GPC)

| Component | SPE1 (%) | SPE2 (%) |
| --- | --- | --- |
| Sorbitol | 1.4 | 0.3 |
| Free fatty acids | 1.2 | 5.9 |
| Sorbitan monooleate | 24.7 | 7.1 |
| Sorbitan dioleate | 41.3 | 30.4 |
| Sorbitan trioleate | 28.7 | 54.3 |
| Unidentified compounds | 2.7 | 1.9 |

Example 1—Synthesis of Diglycerol Partial Ester Additives: DGMO1 and DGMO2

In the presence of a catalyst of the MeONa type, 90 g of diglycerol is reacted at 170° C. with 500 g of oleic sunflower oil (concentration of oleic acid equivalent under reduced pressure of 300 mbar (0.03 MPa) for 6 hours). The procedure is shown below once again for preparing a second sample of product.

TABLE 2

Composition by mass of the products obtained DGMO1 and DGMO2 determined by gel permeation chromatography (GPC)

| Component | DGMO 1 | DGMO 2 |
| --- | --- | --- |
| Diglycerol monoester | 24.7 | 31.4 |
| Diglycerol diester | 41.2 | 30.2 |
| Diglycerol triester | 18.6 | 14.4 |
| Diglycerol tetraester | 6.6 | 6.4 |
| Monoglyceride | 2.4 | nd |
| Diglyceride | 1 | 2.1 |
| Diglycerol | nd | 3.3 |
| Oleic sunflower methyl ester | 5.3 | 6.4 | nd = not determined

Example 2: Synthesis of 3-polyisobutene succinimide-1,2,4-triazole

A 500 mL flask is loaded with 100 g of polyisobutenyl succinic anhydride (PIBSA) with 84% of active ingredient (76.64 mmol), and 26.3 g of an aromatic solvent of the brand "Solvesso 150ND" is added. After the assembly is equipped with a Dean Stark and placed under a nitrogen atmosphere, the reaction medium is heated to 140° C., under vigorous stirring, and then 5.15 g (0.8 eq./61.31 mmol) of 3-amino-1,2,4-triazole is introduced. It is then heated under reflux for 4 h in order to remove 1.10 mL of water in the Dean Stark.

It is cooled to ambient temperature and then additional solvent Solvesso 150ND is added, to obtain a product with 50% of active ingredient. 202.4 g of a clear brown liquid with 50% of active ingredient (50.8% measured) is obtained. The product obtained is a mixture of triazole derivatives in the open form (formula II with $R_1$ and $R_3$=H and $R_4$=PIB) and in the closed form (formula III with $R_1$ and $R_3$=H and $R_4$=PIB or $R_1$ and $R_3$=PIB and $R_4$=H). The ratio of the percentages by mass, open form/closed form, determined by GPC analysis is 95:5.

Example 3: Synthesis of a Quaternary Ammonium Salt QAS

Preparation of a Nitrogen Containing Compound (a)

500 g (0.38 mol) of polyisobutenyl succinic anhydride (PIBSA) is heated to 70° C., introduced into a reactor equipped with a Dean Stark and placed under a nitrogen atmosphere. 76.9 g of heptane and then 52.3 g (0.51 mol/1.34 eq.) of dimethylaminopropylamine (DMAP) are added to the reactor, maintaining the reaction temperature at 70° C. during introduction. The reaction medium is kept at 70° C. for 1 h. The reaction medium is cooled to ambient temperature. The intermediate is recovered.

Quaternization of the Tertiary Amine of the Nitrogen Containing Compound (a)

470 g of the intermediate is placed in a new 2 L reactor equipped with a condenser. Then 180.6 g of 2-ethylhexanol is introduced and the reaction medium is stirred and heated to 55° C. under a nitrogen atmosphere. 40.2 g (0.69 mol) of propylene oxide is then introduced gradually into the mixture by means of a syringe pump over a period of 4 hours, maintaining the reaction temperature at 55° C. The mixture is maintained at this temperature for 16 h. After the medium has cooled, the reaction product, mainly comprising the derivative of quaternary ammonium salt QAS, is recovered.

Samples of said reaction product QAS were analysed qualitatively by infrared absorption spectroscopy (IR), mass spectrometry and NMR. This qualitative analysis made it possible to determine the main components present in the reaction product by comparison with reference spectra and taking into account the degrees of dilution. A quantitative analysis was also performed on dry residue by $^{13}C$ NMR, using an internal standard. The composition by mass of the product QAS measured using the techniques described above is shown in Table 3 below.

TABLE 3

| Components | % by mass |
| --- | --- |
| Quaternary ammonium salt - succinamide form | 69.5 |
| Quaternary ammonium salt - succinimide form | 6.8 |
| PIBSA | 1.7 |
| residual reagents (DMAP-propylene oxide etc.) | 8.4 |
| PIB | 10.2 |
| Other functionalized PIBs | 3.4 |

Test Protocols
Protocol 1: Evaluation of the "Lacquering" Resistance for the Deposits of the IDID Type In order to test the performance of these additives according to the invention, the inventors also developed a new method that is reliable and robust for evaluating the susceptibility of diesel fuels, in particular those of higher grade, to lacquering. This method, in contrast to the methods described in the publications cited above, is not a laboratory method but is based on engine tests and is therefore of technical interest and makes it possible to quantify the effectiveness of the additives or compositions of additives against lacquering. The method for measuring lacquering developed by the inventors is detailed below:

The engine used is a Renault K9K702, four cylinder 16 valve, high pressure injection, common rail diesel engine with a cylinder capacity of 1500 cm$^3$ and a power of 65 kW: regulation of the fuel injection pressure takes place in the high-pressure part of the pump.

The power point is used over a period of 40 h at 4000 rpm; the position of the injector in the chamber is lowered by 1 mm relative to its nominal position, which on the one hand promotes the release of thermal energy from combustion, and on the other hand brings the injector closer to the combustion chamber.

The flow rate of fuel injected is adjusted so as to obtain an exhaust temperature of 750° C. at the start of the test.

The injection advance was increased by 1.5° crankshaft relative to the nominal setting (increasing from +12.5° to +14° crankshaft) always with the aim of increasing the thermal stresses acting on the injector nozzle.

Finally, to increase the stresses on the fuel, the injection pressure was increased by 10 MPa relative to the nominal pressure (i.e. increase from 140 MPa to 150 MPa) and the temperature is set at 65° C. at high-pressure pump inlet.

The technology used for the injectors requires a high fuel return, which promotes degradation of the fuel since it may be subjected to several cycles in the pump and high-pressure chamber before being injected into the combustion chamber.

A variant of the method for testing the clean-up effect (i.e. cleaning of the type 1 and/or type 2 deposits) has also been developed. It is based on the preceding method but is separated into two parts of 40 h and then 30 h:

The first 40 hours are carried out with a higher-grade B7 diesel containing 330 ppm by mass of a detergent of the PIBSI type and 200 ppm by mass of a mixture of fatty acid, predominantly oleic acid with an acid number of 180 mg of KOH/g, this mixture being known to have a tendency to generate deposits of the "lacquering" type. After 40 h, two of the four injectors are dismantled and assessed in order to validate the quantity of deposits present and then replaced by two new injectors.

The last 30 hours of the test are carried out with the product to be evaluated. At the end of the test (70 h in total), the injectors are dismantled and assessed.

At the end of the test, three batches of two injectors are available:

Batch 1:2 injectors after 40 h of higher-grade fuel known for its tendency to generate the "lacquering" described above.

Batch 2:2 injectors after 40 h of higher-grade fuel known for its tendency to generate the "lacquering" described above +30 h of product to be evaluated.

Batch 3:2 injectors after 30 h of product to be evaluated.

Expression of the Results

To ensure that the result is valid, various parameters are monitored during the test: power, torque and fuel consumption indicate if there is fouling of the injector or if its operation has deteriorated through formation of deposits since the operating point is the same throughout the test. The characteristic temperatures of the different fluids (liquid coolant, fuel, oil) allow the validity of the tests to be monitored. The fuel is set at 65° C. at pump inlet, the liquid coolant is set at 90° C. at engine outlet. The smoke values make it possible to monitor combustion timing at the start of the test (target value of 3FSN) and to ensure that it is properly repeatable from one test to another.

Figure 4:
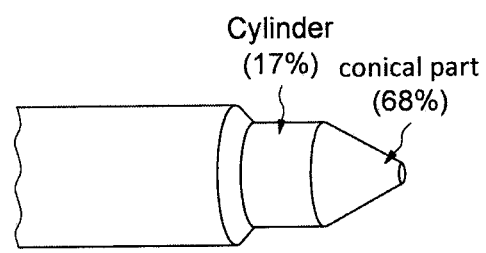
FIG. 4 is a photograph of a needle of a direct-injection diesel engine injector, fouled with deposits of the soap and/or lacquer type ("lacquering").

The injectors are dismantled at the end of the test to examine and assess the deposits formed along the needles. The procedure adopted for assessing the needles is as follows:

The surface of the needle is divided into 100 points. The deposit of soap (type 1) and of lacquer (type 2) is assessed for each point. The cylinder zone (directly after the conical part) represents 68% of the overall score for the needle and the cone zone represents 32% of the overall score for the needle. To facilitate assessment, each of these two zones is divided into 4. In FIG. 4, the percentages shown correspond to a quarter of the surface of the needles: the overall surface weighting is therefore 17×4=68%.

For the soaps (type 1 deposits), the scale of the scores varies from −1 (in the case of a very fine soap) to −10 (in the case of a very thick, strongly coloured soap). A value of the effect of the soap is determined by calculating the arithmetic mean of the scores obtained on the population of points of the needle assessed.

For the lacquers (type 2 deposits), the scale of the scores varies from 1 (in the case of a black lacquer equivalent to significant deposition of lacquer) to 10 (in the case of a very clear lacquer equivalent to a new needle). A value of the effect of the lacquer is calculated by finding the sum of the number of points belonging to the score (1 to 10) divided by the value of the score. An overall score (N) out of 10 is then determined by weighting the effect of the lacquers and soaps.

Thus, for the properties of maintenance of engine cleanliness ("keep-clean" effect), a product performance threshold was determined relative to this assessment procedure: $N<7.5$=Unsatisfactory, $N\geq 7.5$=Satisfactory. For the properties of cleaning the internal parts of the injection system of fouled engines (curative "clean-up" effect), a product performance threshold was determined with respect to this assessment procedure: $\Delta(N^{batch\ 2}-N^{batch\ 1})<1.55$=Unsatisfactory, $\Delta(N^{batch\ 2}-N_G^{batch\ 1})\geq 1.55$=Satisfactory.

Protocol 2: Measurement of Loss of Power in a Diesel Engine with a High-Pressure Injection System (DW10+Zn)

The fuel is tested in a Peugeot DW10 engine using injectors complying with the Euro 5 standards according to the process CEC F-98-8 DW10BTED4 developed and published by the Coordinating European Council (CEC). In order to reproduce the real conditions of a modern diesel engine, a small quantity of zinc neodecanoate (1 ppm) is added to the test fuel. This test was developed for distinguishing between fuels based on their capacity for producing or avoiding external deposits of the injection system relating to coking or clogging of the injection nozzles (nozzle coking or fouling).

This test allows fuels to be differentiated on the basis of the loss of power caused by the deposits of the coking type (comparison between the percentage loss of power). This test in particular makes it possible to differentiate a fuel that produces little deposition of the coking type (loss of power <2%) from those that produce sufficient coking to cause a loss of power of 2% or more, regarded as unacceptable for the engine manufacturers.

The test according to the protocol CEC F-98-8 DW 10 is summarized below:

Engine Euro 4 Peugeot DW10BTED4 2.0L, HDi, turbodiesel, 4 cylinders in line with variable geometry turbocompressor and system for exhaust-gas recirculation (EGR)

Cubic capacity: 1998 cm$^3$

Combustion chamber: 4 valves, direct injection

Power: 100 kW at a speed of 4000 rpm

Torque: 320 N.m at a speed of 2000 rpm
Injection system: Common rail with 6-hole injectors controlled by piezoelectric system (EURO IV)
Max. pressure: 1600 bar
Emission control: Complying with the Euro 4 limits taking into account the system for post-treatment of the exhaust gases.

The test is divided into the following steps: 0-Step of running-in of the injectors: 16 cycles of 1 hour using a non-fouling reference fuel constituted by a diesel representative of the French market (B7=diesel manufactured in France containing 7% of FAME (fatty acid methyl ester) and complying with EN 590). The test on the fuel to be evaluated then takes a total of 44 hours, not counting the periods for preparation and cooling. The time of 44 hours is divided into 32 hours of engine operation and 12 hours with the engine stopped.

1—Engine warm-up step:
1 cycle of 12 minutes under the following conditions:

| Step | Time (min) | Speed (rpm) | Torque (Nm) |
|---|---|---|---|
| 1 | 2 | Stopped | <5 |
| 2 | 3 | 2000 | 50 |
| 3 | 4 | 3500 | 75 |
| 4 | 3 | 4000 | 100 |

The engine power is then increased up to a maximum load of 4000 rpm for 7 minutes and then the average power is measured for 30 s.

2—Operation step: 8 cycles of 1 hour as follows:

| Step | Time (min) | Speed (rpm) | Load (%) | Torque (Nm) | Air temperature after exchanger (° C.) |
|---|---|---|---|---|---|
| 1 | 2 | 1750 | 20 | 62 | 45 |
| 2 | 7 | 3000 | 60 | 173 | 50 |
| 3 | 2 | 1750 | 20 | 62 | 45 |
| 4 | 7 | 3000 | 80 | 212 | 50 |
| 5 | 2 | 1750 | 20 | 62 | 45 |
| 6 | 10 | 4000 | 100 | * | 50 |
| 7 | 2 | 1250 | (10) | 20 | 43 |
| 8 | 7 | 3000 | 100 | * | 50 |
| 9 | 2 | 1250 | (10) | 20 | 43 |
| 10 | 10 | 2000 | 100 | * | 50 |
| 11 | 2 | 1250 | (10) | 20 | 43 |
| 12 | 7 | 4000 | 100 | * | 50 |

At the end of the cycle, the engine speed is adjusted to 1000 rpm/10 Nm in 60 s and is maintained at this speed for 300 s.

3—Cooling step: 60 seconds of cooling while stopped followed by 10 seconds while stopped.

4—Maceration step: engine stopped for 4 hours.

The overall cycle 1 to 4 is repeated 4 times. The loss of power is measured in each operating cycle, i.e. 32 in total.

Test

Test 1 According to Protocol 1: Resistance to "Lacquering"

According to the procedure for evaluating the properties of maintenance of engine cleanliness (preventive "keep-clean" effect) and cleaning of the internal parts of the injection system of fouled engines (curative "clean-up" effect), described above (Protocol 1), performance is evaluated for several compositions of additives introduced in a diesel matrix representative of the French market (B7=diesel manufactured in France containing 7% of FAME (fatty acid methyl ester) and complying with EN 590). The details for each fuel tested, and the results obtained, are shown in Table 4. Note that tests G, G' and G" correspond to the same test, G corresponding to the result for the batch of injectors 1, G' corresponding to the result for the batch of injectors 2 and G" corresponding to the result for the batch of injectors 3. Test G corresponds to the fouling phase ("Dirty-up"), test G' to the cleaning phase ("Clean-up") and test G" to the phase of maintenance of cleanliness ("keep-clean").

The quantities shown in Table 4 are quantities by mass (mg/kg)

TABLE 4

| | Fuel No. | | | | | | | | | | | | | | |
|---|---|---|---|---|---|---|---|---|---|---|---|---|---|---|---|
| | 1 | | | 2 | | | 3 | | | 4 | | | 5 | | |
| | G | G' | G" | G | G' | G" | G | G' | G" | G | G' | G" | G | G' | G" |
| Diesel matrix | B7 | | | B7 | | | B7 | | | B7 | | | B7 | | |
| 3-polyisobutene succinimide-1,2,4-triazole (ppm) | — | — | 200 | 200 | — | — | — | — | — | — | 50 | 50 | — | — | — |
| SPE1 (ppm) | — | — | — | — | — | 200 | 200 | — | — | — | — | — | — | 200 | 200 |
| SPE2 (ppm) | — | — | — | — | — | — | — | — | — | 200 | 200 | — | — | — | — |
| QAS (ppm) | — | — | — | — | — | — | — | 50 | 50 | — | 50 | 50 | — | 50 | 50 |
| N,N-bis(2-ethylhexyl)-1,2,4-triazole-1-methanamine (ppm) | — | — | — | — | — | — | — | — | — | — | — | — | — | 5 | 5 |
| Overall score (N) | 9.6 | 5.6 | 5.52 | 9.55 | 6.90 | 6.99 | 9.43 | 4.92 | 5.19 | 9.91 | 6.54 | 8.32 | 9.04 | 5.6 | 6.48 | 9.52 |
| Δ(N$^{G'}$ − N$^G$) | * | −0.08 | | | −0.09 | | | 0.27 | | | 1.78 | | | 0.88 | | |
| "Keep-clean" effect (yes/no) | * | yes | | | yes | | | yes | | | yes | | | yes | | |
| "Clean-up" effect (yes/no) | * | no | | | no | | | no | | | yes | | | no | | |

* not relevant

These tests demonstrate the curative effectiveness (clean-up effect) of the compositions of additives according to the present invention, i.e. their ability to remove deposits of the lacquer or soap type already formed on the needles since the score for the set of injectors G' is greater than that of the batch of injectors G (there was commencement of significant cleaning of the needle), and also confirms their preventive effectiveness (keep-clean effect) since the score for the set of injectors G" is greatly increased. No curative effect (clean-up effect) is observed when fuels 1, 2 or 3 are used. Thus, it is deduced from this that the first, second and third additives used alone in fuel B7 do not provide a curative effect for said fuel, with respect to deposits of the soap and/or lacquer type. However, it is noted that fuel 4 containing a combination of the first, second and third additives has both a preventive (Keep-clean) and curative (Clean-up) effect. Moreover, it can be seen that comparatively, fuel 5 containing a triazole derivative not covered by the present invention does not have a significant curative effect (Clean-up).

Test 2 According to Protocol 2: Resistance to Coking

The loss of power is evaluated for several compositions of additives introduced in the diesel matrix representative of the French market (B7=diesel manufactured in France containing 7% of FAME (fatty acid methyl ester) and complying with EN 590), according to protocol 2 (DW10+Zn) described above. The details of each fuel tested, and the results obtained, are shown in Table 5.

The quantities shown in Table 5 are quantities by mass (mg/kg).

TABLE 5

| | Fuel No | | | | | |
|---|---|---|---|---|---|---|
| | 6 | 7 | 8 | 9 | 10 | 11 |
| Diesel matrix | B7 | B7 | B7 | B7 | B7 | B7 |
| 3-polyisobutene succinimide-1,2,4-triazole (ppm) | 50 | — | — | — | 50 | 50 |
| SPE2 (ppm) | — | — | — | — | — | 200 |
| QAS (ppm) | — | 50 | 50 | 50 | 50 | 50 |
| N,N-bis(2-ethylhexyl)-1,2,4-triazole-1-methanamine (ppm) | — | — | 5 | 8 | — | — |
| Loss of power (%) | −0.1 | −6.7 | −5.05 | −4.51 | 0.1 | 0.12 |

It can be seen that the fuels containing the composition of additives according to the present invention are particularly remarkable in that they do not generate deposits of the coking type compared with a fuel containing a quaternary ammonium salt alone (fuel 7) or a combination of a quaternary ammonium salt and a triazole derivative different from those covered by the present invention (fuels 8 and 9). The specific choice of a triazole derivative according to the invention in combination with a quaternary ammonium salt and optionally a compound A as described above (fuels 10 and 11) confers upon the fuel both control of deposits of the lacquering type (IDID deposit) and/or resistance to deposits of the coking type. The composition of additives according to the present invention is remarkable in that it makes it possible to obtain fuels having improved performance, in particular in the case of diesel fuels with a low sulphur content, optionally containing a bio diesel. The particular combination of additives described above in particular makes it possible to reduce the fuel consumption of diesel engines, by combining a clean-up effect and keep-clean effect, minimizing the loss of power and improving the wear resistance of said fuel.

The invention claimed is:

1. A composition of fuel additives comprising at least:
(a) a first additive comprising at least one triazole derivative represented by at least one of the following formulas (II) and (III):

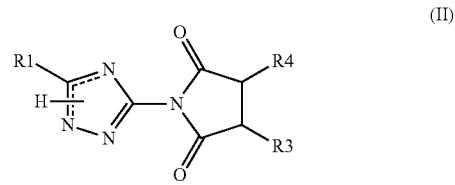

(II)

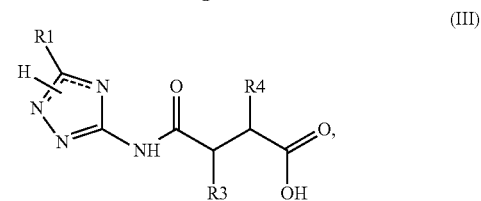

(III)

in which:
R$_1$ is selected from a group comprising a hydrogen atom, a linear or branched C$_1$ to C$_8$ aliphatic hydrocarbon group, a carboxyl group (—CO$_2$H), and R$_3$ and R$_4$ are identical or different and represent, independently of one another, a group selected from a group comprising a hydrogen atom and a linear or branched, saturated or unsaturated, cyclic or acyclic aliphatic hydrocarbon group, having from 2 to 200 carbon atoms; and (b) a second additive comprising a quaternary ammonium salt obtained by reaction of a nitrogen-containing compound comprising a tertiary amine function with a quaternizing agent, the nitrogen-containing compound being selected from a product of reaction of an acylating agent selected from mono- or poly-carboxylic acids substituted with a hydrocarbon group and their derivatives and an amine of the following formula (VII) or (VIII):

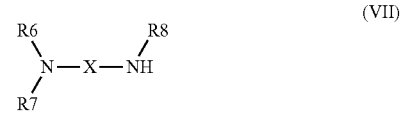

(VII)

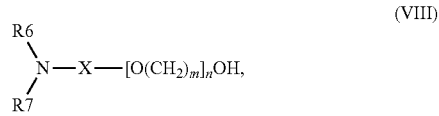

(VIII)

in which:
R$_6$ and R$_7$ are identical or different and represent, independently of one another, an alkyl group having from 1 to 22 carbon atoms,
X is an alkylene group having from 1 to 20 carbon atoms,
m is an integer between 1 and 5,
n is an integer between 0 and 20, and
R$_8$ is a hydrogen atom or an alkyl group having from 1 to 22 carbon atoms.

2. The composition according to claim 1, wherein the mass ratio of the first to the second additive (first:second) is between 1:100 and 100:1.

3. The composition according to claim 1, wherein $R_3$ and $R_4$ of the at least one triazole derivative are identical or different and represent, independently of one another, a group selected from a group comprising a hydrogen atom and an aliphatic hydrocarbon group having a number-average molecular weight (Mn) between 200 and 3000.

4. The composition according to claim 1, wherein the at least one triazole derivative is represented by formula (II).

5. The composition according to claim 1, wherein the at least one triazole derivative is represented by formula (III).

6. The composition according to claim 1, wherein the first additive comprises a mixture of triazole derivatives represented by formulae (II) and (III).

7. The composition according to claim 1, wherein the at least one triazole derivative is obtained by reaction of an aminotriazole of the following formula (IV) with a diacid of the following formula (V) and/or a succinic anhydride of the following formula (VI):

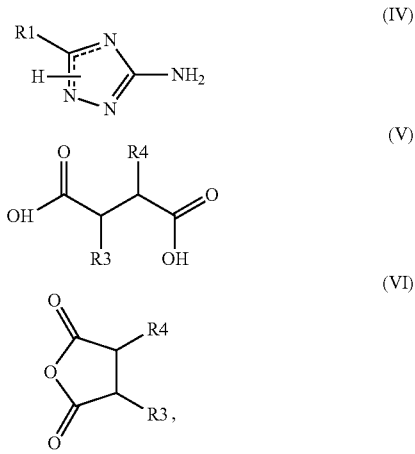

in which $R_1$, $R_3$ and $R_4$ are as previously defined.

8. The composition according to claim 1, wherein the quaternizing agent is selected from a group comprising the dialkyl sulphates, the carboxylic acid esters, the alkyl halides, the benzyl halides, the hydrocarbon carbonates and the hydrocarbon epoxides optionally mixed with an acid, alone or in a mixture.

9. The composition according to claim 1, further comprising a third additive comprising at least 50% by mass of a compound A selected from partial esters of polyols and of saturated or unsaturated, linear or branched, cyclic or acyclic $C_4$ to $C_{36}$ monocarboxylic aliphatic hydrocarbons, the partial esters being able to be used alone or in a mixture.

10. The composition according to claim 9, wherein the compound A comprises x ester unit(s), y hydroxyl unit(s) and z ether unit(s), x, y and z being integers such that x varies from 1 to 10, y varies from 1 to 10, and z varies from 0 to 6.

11. The composition according to claim 9, wherein the compound A is obtained by esterification between:
one or more $C_4$ to $C_{36}$ fatty acid(s) optionally comprising one or more ethylenic bonds; and
a linear or branched, cyclic or acyclic polyol, optionally comprising a heterocycle with 5 to 6 atoms, substituted with hydroxyl groups.

12. The composition according to claim 11, wherein the fatty acids are selected from a group constituted by stearic, isostearic, linolenic, oleic, linoleic, behenic, arachidonic, ricinoleic, palmitic, myristic, lauric, and capric acids, used alone or in a mixture.

13. The composition according to claim 11, wherein the polyol is selected from the polyols comprising more than three hydroxyl functions and the polyols comprising at least one heterocycle with 5 or 6 atoms.

14. The composition according to claim 11, wherein the polyol is selected from the polyols comprising at least two heterocycles with 4 or 5 carbon atoms and one oxygen atom, linked by the formation of an acetal bond between a hydroxyl function of each ring, the heterocycles optionally being substituted with hydroxyl groups.

15. The composition according to claim 9, wherein the polyol is selected from a group consisting of erythritol, xylitol, arabitol, ribitol, sorbitol, maltitol, isomaltitol, lactitol, volemitol, mannitol, pentaerythritol, 2-hydroxymethyl-1,3-propandediol, 1,1,1-tri(hydroxymethyl)ethane, trimethylolpropane, sorbitan and the carbohydrates.

16. The composition according to claim 9, wherein the compound A is the sorbitan partial esters, used alone or in a mixture.

17. The composition according to claim 9, wherein the compound A is selected from the monoester(s) and/or diester(s) of polyglycerols having from 2 to 5 glycerol units per molecule.

18. The composition according to claim 17, wherein the compound A is selected from the monoester(s) and/or diester(s) of polyglycerols derived from fatty acid(s), having more than 50% by number of fatty chains comprising between 12 and 24 carbon atoms.

19. The composition according to claim 17, wherein the compound A is selected from the diglycerol and/or triglycerol monoester(s) and/or diester(s).

20. A diesel fuel, comprising:
(a) a first additive comprising at least one triazole derivative represented by at least one of the following formulas (II) and (III):

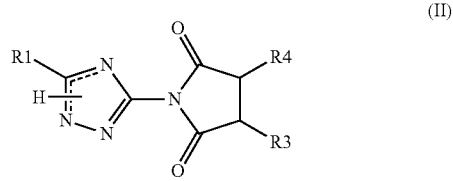

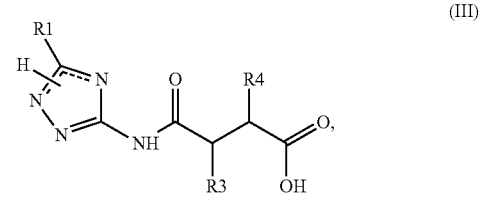

in which:
$R_1$ is selected from a group comprising a hydrogen atom, a linear or branched $C_1$ to $C_8$ aliphatic hydrocarbon group, a carboxyl group (—$CO_2H$), and
$R_3$ and $R_4$ are identical or different and represent, independently of one another, a group selected from a group comprising a hydrogen atom and a linear or branched, saturated or unsaturated, cyclic or acyclic aliphatic hydrocarbon group, having from 2 to 200 carbon atoms; and (b) a second additive comprising a quaternary ammonium salt obtained by reaction of a nitrogen-containing compound comprising a tertiary amine function with a quaternizing agent, the nitrogen-containing compound being selected from a product of reaction of an acylating agent selected from mono- or poly-carboxylic acids substituted with a hydrocarbon group and their derivatives and an amine of the following formula (VII) or (VIII):

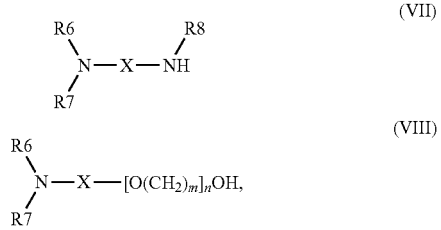

in which:

$R_6$ and $R_7$ are identical or different and represent, independently of one another, an alkyl group having from 1 to 22 carbon atoms, X is an alkylene group having from 1 to 20 carbon atoms, m is an integer between 1 and 5, n is an integer between 0 and 20, and $R_8$ is a hydrogen atom or an alkyl group having from 1 to 22 carbon atoms;

having a sulphur content less than or equal to 500 ppm by mass comprising at least 5 ppm by mass of a composition of the additives.

21. The diesel fuel according to claim 20, further comprising bio diesel, wherein there is up to 30% by volume of the bio diesel.

22. The diesel fuel according to claim 20, further comprising at least one or more other additives selected from antioxidants, combustion improvers, corrosion inhibitors, low temperature performance additives, dyes, demulsifiers, metal deactivators, antifoaming agents, cetane number improvers, lubricity additives, co-solvents and compatibilizing agents.

23. The diesel fuel according to claim 20, wherein the concentration by mass of each first and second additive and optionally third additive varies from 5 to 5000 ppm.

24. A method for improving a performance of a diesel engine, the method comprising using a diesel fuel in the diesel engine, the diesel fuel comprising:

(a) a first additive comprising at least one triazole derivative represented by at least one of the following formulas (II) and (III):

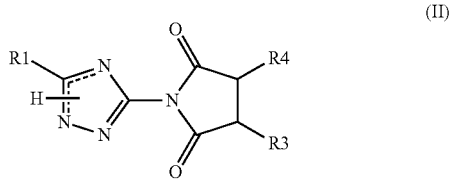

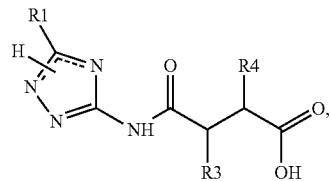

in which:

$R_1$ is selected from a group comprising a hydrogen atom, a linear or branched $C_1$ to $C_8$ aliphatic hydrocarbon group, a carboxyl group ($-CO_2H$), and $R_3$ and $R_4$ are identical or different and represent, independently of one another, a group selected from a group comprising a hydrogen atom and a linear or branched, saturated or unsaturated, cyclic or acyclic aliphatic hydrocarbon group, having from 2 to 200 carbon atoms; and (b) a second additive comprising a quaternary ammonium salt obtained by reaction of a nitrogen-containing compound comprising a tertiary amine function with a quaternizing agent, the nitrogen-containing compound being selected from a product of reaction of an acylating agent selected from mono- or poly-carboxylic acids substituted with a hydrocarbon group and their derivatives and an amine of the following formula (VII) or (VIII):

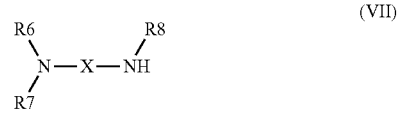

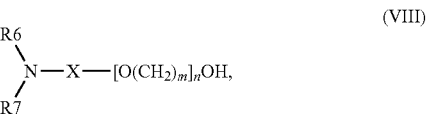

in which:

$R_6$ and $R_7$ are identical or different and represent, independently of one another, an alkyl group having from 1 to 22 carbon atoms, X is an alkylene group having from 1 to 20 carbon atoms, m is an integer between 1 and 5, n is an integer between 0 and 20, and $R_8$ is a hydrogen atom or an alkyl group having from 1 to 22 carbon atoms.

25. The method according to claim 24, further comprising limiting deposits in the diesel engine by use of the diesel fuel.

26. The method according to claim 24, wherein the engine is a direct-injection engine.

27. The method according to claim 24, further comprising reducing fuel consumption of the engine ("Fuel Eco" effect) by use of the diesel fuel.

28. The method according to claim 24, further comprising minimizing the loss of power of the engine by use of the diesel fuel.

29. The method according to claim 24, further comprising maintaining cleanliness of the engine ("keep-clean" effect) by limiting deposits of soap and/or lacquer in internal components of injection systems of the engine by use of the diesel fuel.

30. The method according to claim 24, further comprising cleaning fouled internal parts of an injection system of the engine, by removing, at least partly, deposits of soap and/or lacquer in the internal parts (curative "clean-up" effect) by use of the diesel fuel.

31. The composition according to claim 1, wherein the first additive is 3-polyisobutene succinimide-1,2,4-triazole and the second additive is a quaternary ammonium salt obtained by a reacting a reaction product of a reaction between polyisobutenyl succinic anhydride and dimethylaminopropylamine with propylene oxide.

* * * * *